US011223880B2

(12) United States Patent
Liu et al.

(10) Patent No.: US 11,223,880 B2
(45) Date of Patent: Jan. 11, 2022

(54) PICTURE GENERATION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Song Liu, Shenzhen (CN); Huaizheng Wang, Shenzhen (CN); Binbin Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/027,935

(22) Filed: Sep. 22, 2020

(65) Prior Publication Data
US 2021/0006867 A1 Jan. 7, 2021

Related U.S. Application Data

(63) Continuation of application No. PCT/CN2019/091730, filed on Jun. 18, 2019.

(30) Foreign Application Priority Data

Aug. 17, 2018 (CN) .................. 201810942879.X

(51) Int. Cl.
H04N 21/488 (2011.01)
H04N 21/422 (2011.01)
(Continued)

(52) U.S. Cl.
CPC ... *H04N 21/4884* (2013.01); *H04N 21/42204* (2013.01); *H04N 21/4316* (2013.01); *H04N 21/440218* (2013.01)

(58) Field of Classification Search
CPC ......... H04N 21/4884; H04N 21/42204; H04N 21/4316; H04N 21/440218;
(Continued)

(56) References Cited

U.S. PATENT DOCUMENTS 5,805,153 A * 9/1998 Nielsen ............... H04N 21/235
725/37
8,866,886 B2 * 10/2014 Suh ..................... H04N 13/183
348/43
(Continued)

FOREIGN PATENT DOCUMENTS

CN 1937732 A 3/2007
CN 102917033 A 2/2013
(Continued)

OTHER PUBLICATIONS

The World Intellectual Property Organization (WIPO) International Search Report for PCT/CN2019/091730 dated Sep. 9, 2019 5 Pages (including translation).
(Continued)

Primary Examiner — Paulos M Natnael
(74) Attorney, Agent, or Firm — Anova Law Group, PLLC

(57) ABSTRACT

A picture generation method includes: displaying a subtitle list of a target video; obtaining, in response to a selection instruction corresponding to a target subtitle in the subtitle list, a target image frame corresponding to the target subtitle in the target video; displaying the target image frame in a stitching preview region; and generating, in response to a picture generation instruction, a collage picture according to the target image frame included in the stitching preview region.

20 Claims, 22 Drawing Sheets

(51) Int. Cl.
*H04N 21/431* (2011.01)
*H04N 21/4402* (2011.01)

(58) Field of Classification Search
CPC ............. H04N 21/8549; H04N 21/431; H04N 21/458; H04N 21/4825; H04N 21/485
USPC ........................................................ 348/468
See application file for complete search history.

(56) References Cited

U.S. PATENT DOCUMENTS

| | | | |
|---|---|---|---|
| 9,609,397 B1* | 3/2017 | Barreira Avegliano | ..................... H04N 21/23424 |
| 10,489,496 B1* | 11/2019 | Sen | .................... H04N 21/4882 |
| 10,645,332 B2* | 5/2020 | Zhang | ................. G06K 9/00711 |
| 10,945,041 B1* | 3/2021 | Chatterjee | ............. G10L 15/005 |
| 2007/0040936 A1 | 2/2007 | Park | |
| 2007/0047901 A1* | 3/2007 | Ando | .................. G11B 27/105 386/241 |
| 2009/0175596 A1* | 7/2009 | Hirai | ........................ G11B 27/11 386/248 |
| 2010/0142925 A1* | 6/2010 | Asano | ..................... H04N 5/775 386/241 |
| 2011/0075029 A1* | 3/2011 | Maruyama | .......... H04N 21/4856 348/468 |
| 2016/0035074 A1* | 2/2016 | Jeong | ........................ G06T 3/40 382/282 |
| 2016/0267634 A1* | 9/2016 | Nam | ........................ G06T 11/60 |
| 2016/0277779 A1 | 9/2016 | Zhang et al. | |
| 2017/0332020 A1 | 11/2017 | Ouyang et al. | |
| 2018/0314919 A1* | 11/2018 | Onozawa | .............. G06K 9/6218 |
| 2019/0158934 A1 | 5/2019 | Wang et al. | |
| 2019/0230417 A1* | 7/2019 | Parthasarathi | .......... G11B 27/00 |
| 2020/0066305 A1 | 2/2020 | Spence et al. | |
| 2020/0296473 A1* | 9/2020 | Wang | .................. H04N 21/4314 |
| 2021/0105538 A1* | 4/2021 | Ogawa | ............... H04N 21/8456 |

FOREIGN PATENT DOCUMENTS

| | | |
|---|---|---|
| CN | 103634605 A | 3/2014 |
| CN | 104023272 A | 9/2014 |
| CN | 104185086 A | 12/2014 |
| CN | 105163178 A | 12/2015 |
| CN | 105338419 A | 2/2016 |
| CN | 105898520 A | 8/2016 |
| CN | 105979169 A | 9/2016 |
| CN | 106454151 A | 2/2017 |
| CN | 107484018 A | 12/2017 |
| CN | 108200463 A | 6/2018 |
| CN | 108259991 A | 7/2018 |
| CN | 108347643 A | 7/2018 |
| CN | 108924626 A | 11/2018 |
| TW | 201640888 A | 11/2016 |
| WO | 2017179761 A1 | 10/2017 |

OTHER PUBLICATIONS

The State Intellectual Property Office of the People's Republic of China (SIPO) Office Action 1 for 201810942879.X dated Aug. 4, 2020 10 Pages (including translation).
Taiwan Intellectual Property Office Examination report for Application No. 10920794750 dated Aug. 20, 2020 9 pages (including translation).
Indian Patent Office Examination report for Application No. 202047041809 dated Sep. 9, 2021 7 pages.

* cited by examiner

PICTURE GENERATION METHOD AND APPARATUS, DEVICE, AND STORAGE MEDIUM

CROSS-REFERENCES TO RELATED APPLICATIONS

This application is a continuation application of PCT Patent Application No. PCT/CN2019/091730, filed on Jun. 18, 2019, which claims priority to Chinese Patent Application No. 201810942879.X, entitled "PICTURE GENERATION METHOD AND APPARATUS, DEVICE, AND STORAGE MEDIUM" and filed with the National Intellectual Property Administration, PRC on Aug. 17, 2018, the entire contents of both of which are incorporated herein by reference.

FIELD OF THE TECHNOLOGY

Embodiments of the present disclosure relate to the field of image processing technologies, and in particular, to a picture generation method and apparatus, a device, and a storage medium.

BACKGROUND OF THE DISCLOSURE

Subtitle collaging refers to a process of combining several video pictures including subtitles to generate a long picture. The subtitle collaging is also referred to as subtitle stitching.

In the related art, subtitle stitching is implemented by using the following manner: In a process of watching a video, a user takes screenshots of video pictures by using third-party screenshot software, to obtain several screenshots including subtitles; and then, the user may arrange and combine the screenshots by using third-party picture processing software, to finally generate a long picture.

However, this manner is complex in operation and time-consuming.

SUMMARY

According to various embodiments provided in the present disclosure, a picture generation method and apparatus, a device, and a storage medium are provided.

According to one aspect, an embodiment of the present disclosure provides a picture generation method, performed by a terminal, the method including: displaying a subtitle list of a target video; obtaining, in response to a selection instruction corresponding to a target subtitle in the subtitle list, a target image frame corresponding to the target subtitle in the target video; displaying the target image frame in a stitching preview region; and generating, in response to a picture generation instruction, a collage picture according to the target image frame included in the stitching preview region.

According to another aspect, an embodiment of the present disclosure provides a terminal, including a memory and a processor, the memory storing a computer-readable instruction, and the computer-readable instruction, when executed by the processor, causing the processor to perform: displaying a subtitle list of a target video; obtaining, in response to a selection instruction corresponding to a target subtitle in the subtitle list, a target image frame corresponding to the target subtitle in the target video; displaying the target image frame in a stitching preview region; and generating, in response to a picture generation instruction, a collage picture according to the target image frame included in the stitching preview region.

According to yet another aspect, an embodiment of the present disclosure provides one or more non-transitory storage media storing a computer-readable instruction, the computer-readable instruction, when executed by one or more processors, causing the one or more processors to perform: displaying a subtitle list of a target video; obtaining, in response to a selection instruction corresponding to a target subtitle in the subtitle list, a target image frame corresponding to the target subtitle in the target video; displaying the target image frame in a stitching preview region; and generating, in response to a picture generation instruction, a collage picture according to the target image frame included in the stitching preview region.

Details of one or more embodiments of the present disclosure are provided in the following accompany drawings and descriptions. Other features, objectives, and advantages of the present disclosure become apparent from the specification, the accompanying drawings, and the claims.

BRIEF DESCRIPTION OF THE DRAWINGS

To describe the technical solutions of the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other accompanying drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
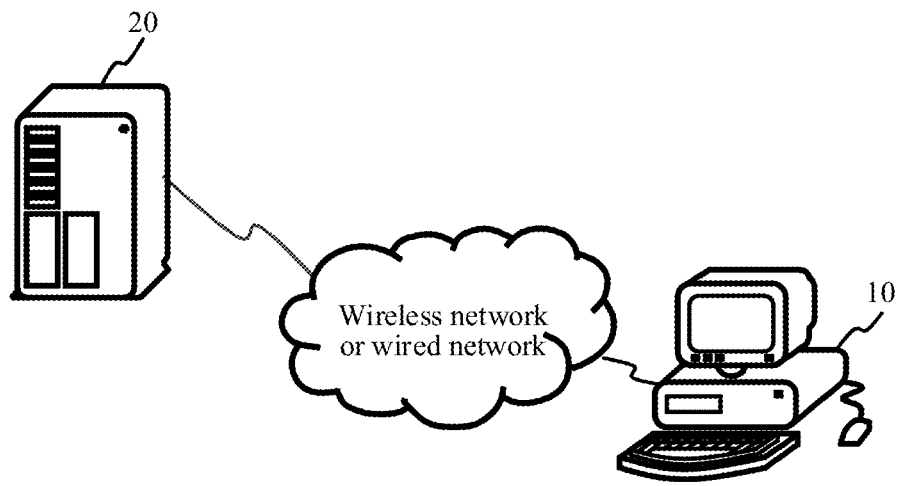
FIG. 1 is a schematic diagram of an implementation environment according to some embodiments of the present disclosure.

FIG. 1 shows a schematic diagram of an implementation environment according to some embodiments of the present disclosure. The implementation environment may include a terminal 10 and a server 20.

The terminal 10 may be an electronic device such as a personal computer (PC), a mobile phone, a tablet computer, a smart television, or a multimedia playback device. A video player may be installed and run in the terminal 10, to play a video through the video player. The video player may be in the form of a client, or may be in the form of a web page. This is not limited in the embodiments of the present disclosure.

The server 20 is configured to provide a backend service for the video player of the terminal 10. The server 20 may be one server, a server cluster including a plurality of servers, or a cloud computing service center.

The terminal 10 may communicate with the server 20 through a network. The network may be a wired network or a wireless network.

Figure 2:
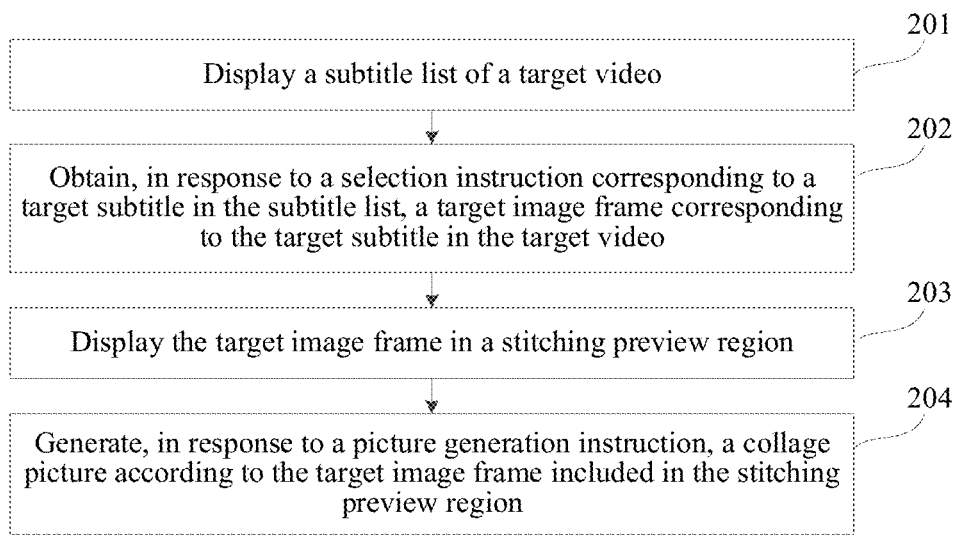
FIG. 2 is a flowchart of a picture generation method according to some embodiments of the present disclosure.

FIG. 2 shows a flowchart of a picture generation method according to some embodiments of the present disclosure. The method is performed by a terminal, and the terminal may be the terminal 10 in the embodiment of FIG. 1. Optionally, the method is performed by the video player (for example, a video client) in the terminal 10. The method may include the following steps:

Step 201: Display a subtitle list of a target video.

The target video may be any video. For example, the target video refers to a video currently displayed by the video player. In the embodiments of the present disclosure, the type of the target video is not limited. For example, the target video may be at least one type of a film, a television series, a variety show, or an animation.

The subtitle list of the target video includes at least one subtitle of the target video. Optionally, the subtitle list of the target video includes all or some subtitles of the target video. Subtitles of a video, as used herein, may include text derived from either a transcript or screenplay of dialogue or commentary in the video. The subtitles are usually displayed at a bottom (or top) of the video when the subtitle function is turned on. The subtitle may be in the same language as the original language spoken or used in the video or may be in another language translated from the original language. The subtitles of the video may each have a timestamp or a display period indicating its corresponding time to appear during the playback progress of the video. This is not limited in the embodiments of the present disclosure. The terminal may display the subtitles of the target video in the form of a list. For example, the list includes several lines, and each line corresponds to one subtitle.

Optionally, the step includes the following several sub-steps:

1. Display a playing interface of the target video.

The playing interface of the target video refers to a user interface playing the target video. For example, as shown in FIG. 3, the terminal displays a playing interface 30 of the target video.

2. Obtain a trigger instruction corresponding to a target operation control in the playing interface.

The target operation control refers to a control used for triggering to perform an image obtaining operation. For example, the target operation control may be a button. Certainly, in other possible implementations, the terminal may be triggered, in at least one manner of a speech, a gesture, or an expression, to execute the image obtaining operation. This is not limited in the embodiments of the present disclosure.

Figure 3:
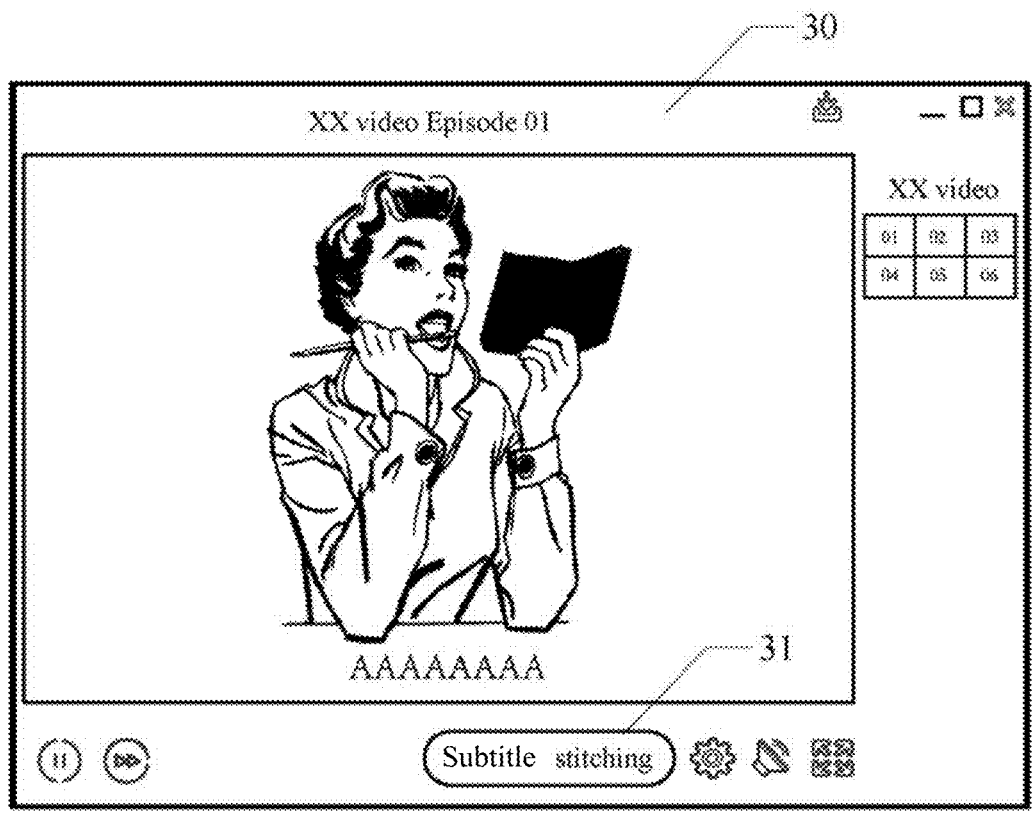
FIG. 3 is a schematic diagram of a playing interface according to some embodiments of the present disclosure.

Exemplarily, as shown in FIG. 3, a "subtitle stitching" button 31 is set in the playing interface 30. A user taps the "subtitle stitching" button 31, and accordingly, the terminal obtains a trigger instruction corresponding to the "subtitle stitching" button 31.

3. Obtain a real-time image frame of the target video according to the trigger instruction corresponding to the target operation control.

The real-time image frame refers to an image frame displayed in the playing interface when the trigger instruction is obtained.

In a possible implementation, when the terminal obtains the trigger instruction corresponding to the target operation control, the terminal takes a screenshot of an image frame currently displayed in the playing interface, to obtain a real-time image frame.

In another possible implementation, when the terminal obtains the trigger instruction corresponding to the target operation control, the terminal obtains a currently played timestamp of the target video, and transmits an image obtaining request to a server. The image obtaining request carries identification information of the target video and the timestamp. After receiving the image obtaining request transmitted by the terminal, the server obtains an image frame corresponding to the timestamp as a real-time image frame, and transmits the real-time image frame to the terminal. Accordingly, the terminal receives the real-time image frame transmitted by the server.

In the first manner, the terminal obtains the real-time image frame by taking a screenshot, and latency required for request and response performed between the terminal and the server may be saved, which is timelier and more efficient.

4. Display a subtitle stitching interface.

The subtitle stitching interface includes a subtitle display region and a stitching preview region. The subtitle display region is used for displaying a subtitle, and the stitching preview region is used for displaying an image frame selected by the user.

Figure 4:
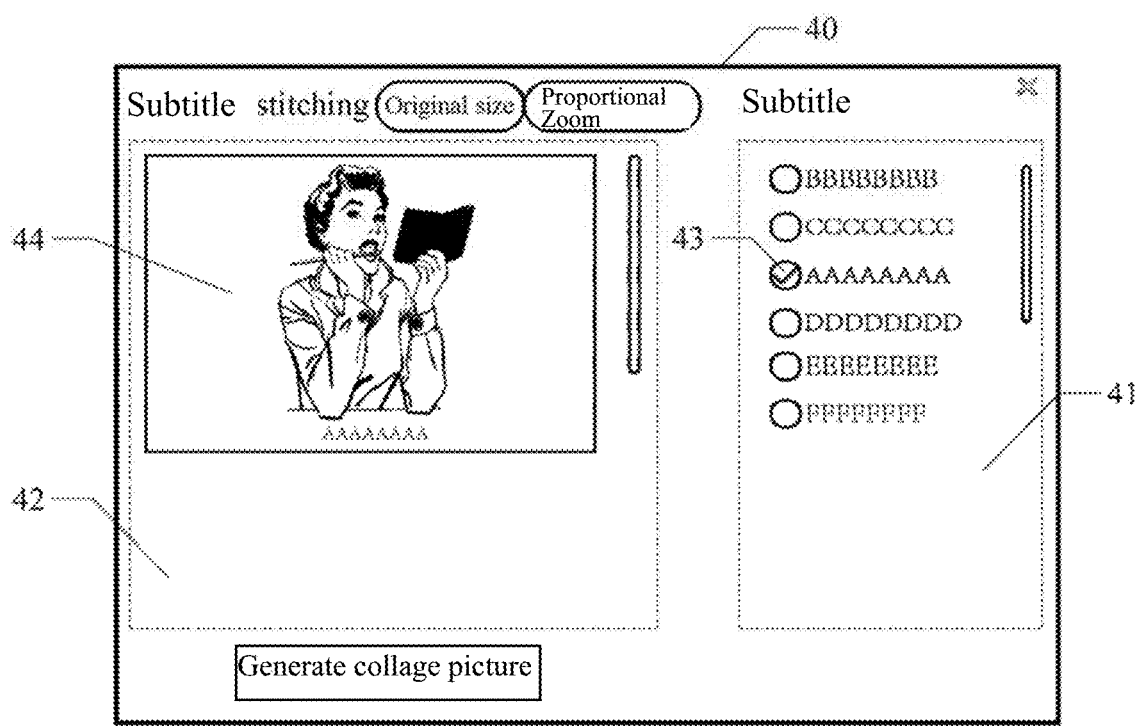
FIG. 4 is a schematic diagram of a subtitle stitching interface according to some embodiments of the present disclosure.

Exemplarily, with reference to FIG. 3 and FIG. 4, after the user taps the "subtitle stitching" button 31, the terminal displays a subtitle stitching interface 40. The subtitle stitching interface 40 includes a subtitle display region 41 and a stitching preview region 42.

Optionally, the subtitle stitching interface is overlay-displayed on an upper layer of the playing interface in the form of a floating window. A size of the subtitle stitching interface may be preset by a designer, for example, the size of the subtitle stitching interface is 1100×700 pixels.

5. Display the subtitle list of the target video in the subtitle display region, and display the real-time image frame in the stitching preview region.

As shown in FIG. 4, the terminal displays the subtitle list of the target video in the subtitle display region 41. Optionally, each subtitle corresponds to one selection control, and the user may select or deselect the corresponding subtitle through the selection control. In the subtitle display region 41, a selection control 43 corresponding to the subtitle in the real-time image frame is in a checked state, which indicates that the subtitle is selected. In addition, as shown in FIG. 4, a real-time image frame 44 is displayed in the stitching preview region 42.

Figure 5:
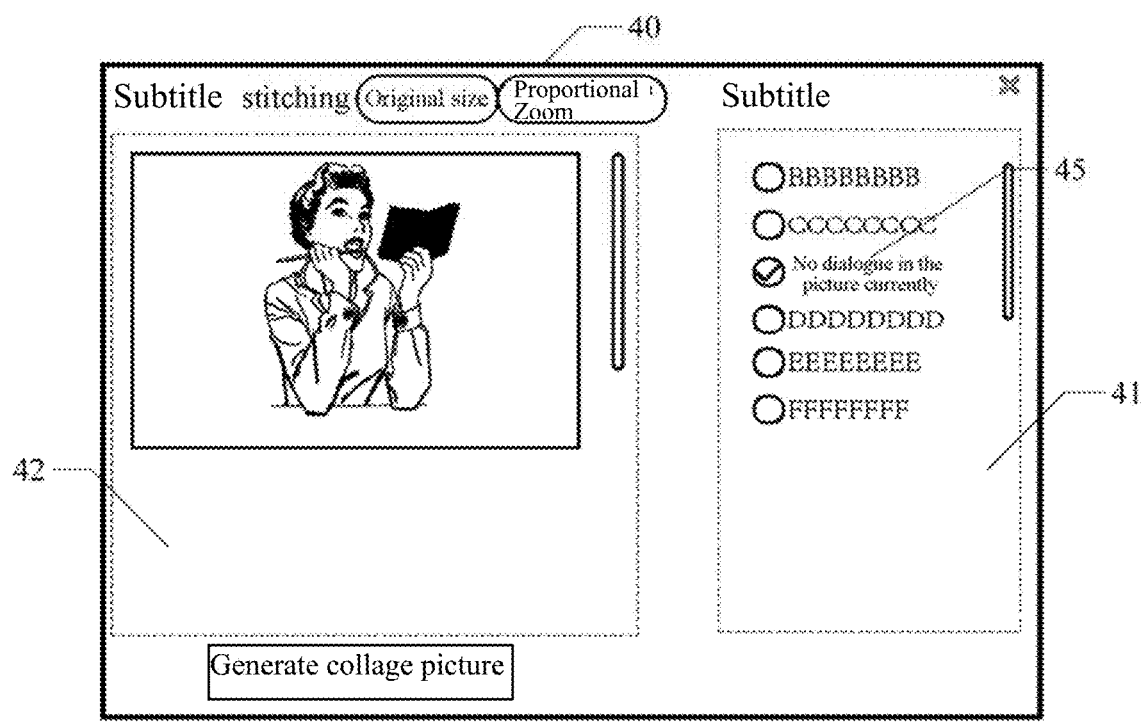
FIG. 5 is a schematic diagram of a subtitle stitching interface according to some other embodiments of the present disclosure.

If there is no subtitle in the real-time image frame, the terminal may display a prompt message in the subtitle display region. The prompt message is used for indicating that there is no subtitle in the real-time image frame. For example, as shown in FIG. 5, when there is no subtitle in the real-time image frame, the terminal displays a prompt message 45 of "no subtitle in the picture currently" in the subtitle display region 41, and a selection control corresponding to the prompt message 45 is in a checked state.

Further, after the real-time image frame is added to the stitching preview region for display, the real-time image frame may become a target image frame, and the subtitle corresponding to the real-time image frame may be a target subtitle. Various operations performed on the target image frame in the stitching preview region may all be applicable to the real-time image frame.

Optionally, in the subtitle list of the target video, the subtitles are arranged from top to bottom in chronological order. A maximum quantity of subtitles that can be displayed in the subtitle display region may be preset by the designer, for example, the maximum quantity is 10. When a total quantity of the subtitles of the target video is greater than the maximum quantity, all subtitles of the target video may be displayed in the subtitle display region in a scrolling to preview manner.

In addition, when the terminal initially displays the subtitle stitching interface, the terminal may display the subtitle in the real-time image frame or the prompt message used for indicating that there is no subtitle in the real-time image frame at a specified position of the subtitle display region. For example, the specified position is the third position in the maximum quantity. Subtitles located before and after the timestamp corresponding to the real-time image frame are respectively displayed above or below the position for the user to select.

Step 202: Obtain, in response to obtaining a selection instruction corresponding to a target subtitle in the subtitle list, a target image frame corresponding to the target subtitle in the target video.

Figure 6:
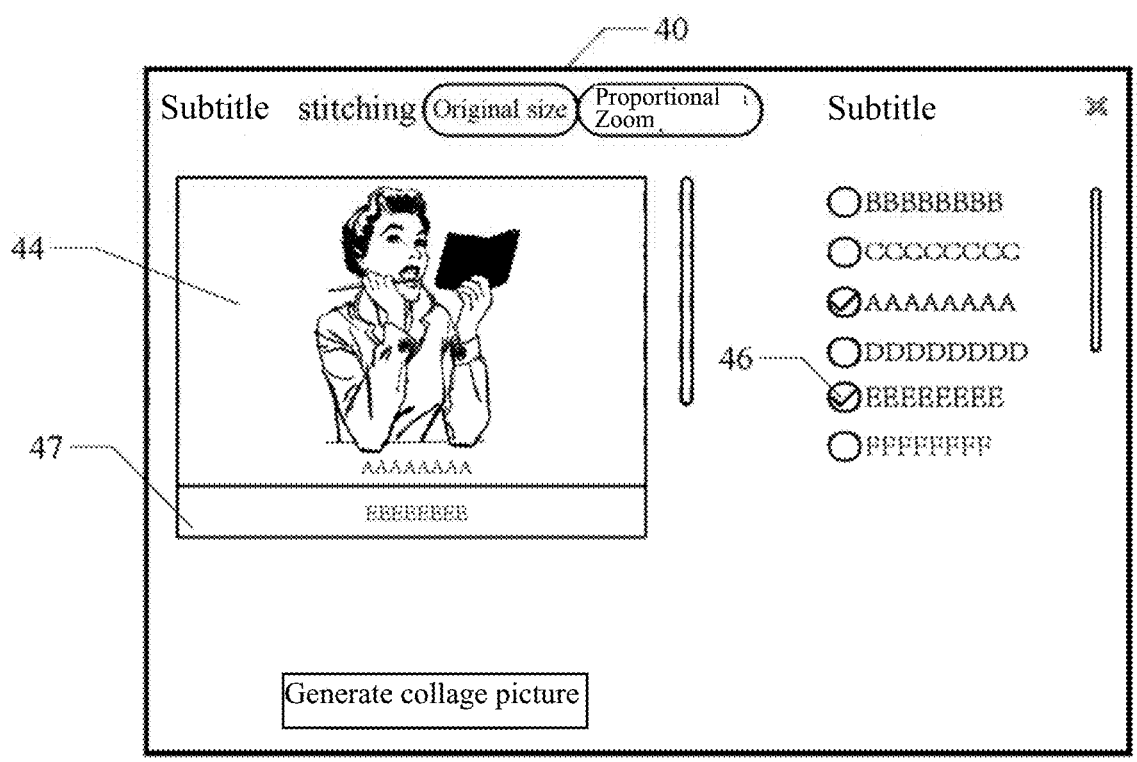
FIG. 6 is a schematic diagram of adding a target image frame according to some embodiments of the present disclosure.

The target subtitle may be any subtitle in the subtitle list. The selection instruction corresponding to the target subtitle refers to an instruction triggered by the user and used for instructing to select the target subtitle. Optionally, as shown in FIG. 6, the user may tap a selection control 46 corresponding to a subtitle "EEEEEEEE" to trigger a selection instruction. Certainly, in other possible implementations, the selection instruction may alternatively be triggered in at least one manner of a speech, a gesture, or an expression. This is not limited in the embodiments of the present disclosure.

The target image frame refers to an image frame within a display period corresponding to the target subtitle. For example, the timestamp of the target image frame in the target video is within the display period of the target subtitle. Optionally, the target image frame is one image frame within the display period corresponding to the target subtitle. Each subtitle in the target video corresponds to one display period, and the display period refers to a period of displaying the subtitle in the process of playing the target video. For example, if a display period corresponding to one subtitle is 15:32-15:36, it indicates that the subtitle is displayed when video content from 15:32 to 15:36 of the target video is played. That is, the subtitle is displayed in all image frames included in the video content from 15:32 to 15:36 of the target video.

In addition, the target image frame may be the first image frame within the display period corresponding to the target subtitle, or may be the last image frame within the display period corresponding to the target subtitle, or may be any image frame within the display period corresponding to the target subtitle. Which image frame within the display period corresponding to the target subtitle is selected as the target image frame may be preset by the designer or the user. This is not limited in the embodiments of the present disclosure.

The terminal may obtain the target image frame corresponding to the target subtitle in the target video in the following manners:

In a possible implementation, the terminal obtains a display period corresponding to the target subtitle, and selects the target image frame from image frames included within the display period.

In another possible implementation, the terminals transmits an image obtaining request to the server, the image obtaining request including identification information of the target video and identification information of the target subtitle. The identification information of the target subtitle may be the display period or a number corresponding to the target subtitle. After receiving the image obtaining request, the server selects, according to the identification information of the target video and the identification information of the target subtitle, image frames within the display period corresponding to the target subtitle from the target video, and then selects the target image frame from the image frames.

For an offline video, the terminal may obtain the target image frame in the first manner, and for an online video, the terminal may obtain the target image frame in the second manner.

Step 203: Display the target image frame in a stitching preview region.

As shown in FIG. 6, after the user selects the subtitle "EEEEEEEE", the terminal displays an image frame 47 corresponding to the subtitle "EEEEEEEE" in the stitching preview region.

Optionally, an arrangement sequence of the target image frame included in the stitching preview region is consistent with an arrangement sequence of the selected target subtitle in the subtitle list. As shown in FIG. 6, in the subtitle list, a subtitle "AAAAAAAA" is arranged before the subtitle "EEEEEEEE", and accordingly, in the stitching preview region, an image frame 44 corresponding to the subtitle "AAAAAAAA" is arranged before the image frame 47 corresponding to the subtitle "EEEEEEEE". In some examples, the arrangement sequence may be chronological.

In addition, display states of the target image frame in the stitching preview region may include the two following states: an unfolded state and a folded state. The unfolded state refers to a display state in which all content of the target image frame is visible (for example, the image frame 44 in FIG. 6 is in the unfolded state), and the folded state refers to a display state in which only a subtitle region in the target image frame is visible (for example, the image frame 47 in FIG. 6 is in the folded state).

The subtitle region refers to a partial region of the target image frame, and the partial region includes the subtitle in the target image frame. Optionally, the subtitle region of the target image frame may be determined according to a position of the subtitle in the target image frame. For example, the terminal may use, according to height information of the subtitle in the target image frame, a rectangular region surrounded by a bottom edge of the target image frame and a top edge of the subtitle as the subtitle region. The height information of the subtitle refers to a distance between the top edge of the subtitle and the bottom edge of the target image frame.

That the terminal adds and displays the target image frame in the stitching preview region may be adding and displaying the target image frame in the stitching preview region in the folded state. That is, no matter the target image frame is arranged before the real-time image frame or after the real-time image frame, the target image frame is added and displayed in the folded state. As shown in FIG. 6, the terminal adds and displays the image frame 47 corresponding to the subtitle "EEEEEEEE" in the folded state in the stitching preview region.

In addition, in the embodiments of the present disclosure, a function of switching the display state of the target image frame in the stitching preview region is further provided. Using an example in which the display state of the target image frame is switched, after the terminal obtains a display state switching instruction corresponding to the target image frame, if the display state of the target image frame is the unfolded state, the terminal switches the target image frame from the unfolded state to the folded state for display; and if the display state of the target image frame is the folded state, the terminal switches the target image frame from the folded state to the unfolded state for display.

Figure 7:
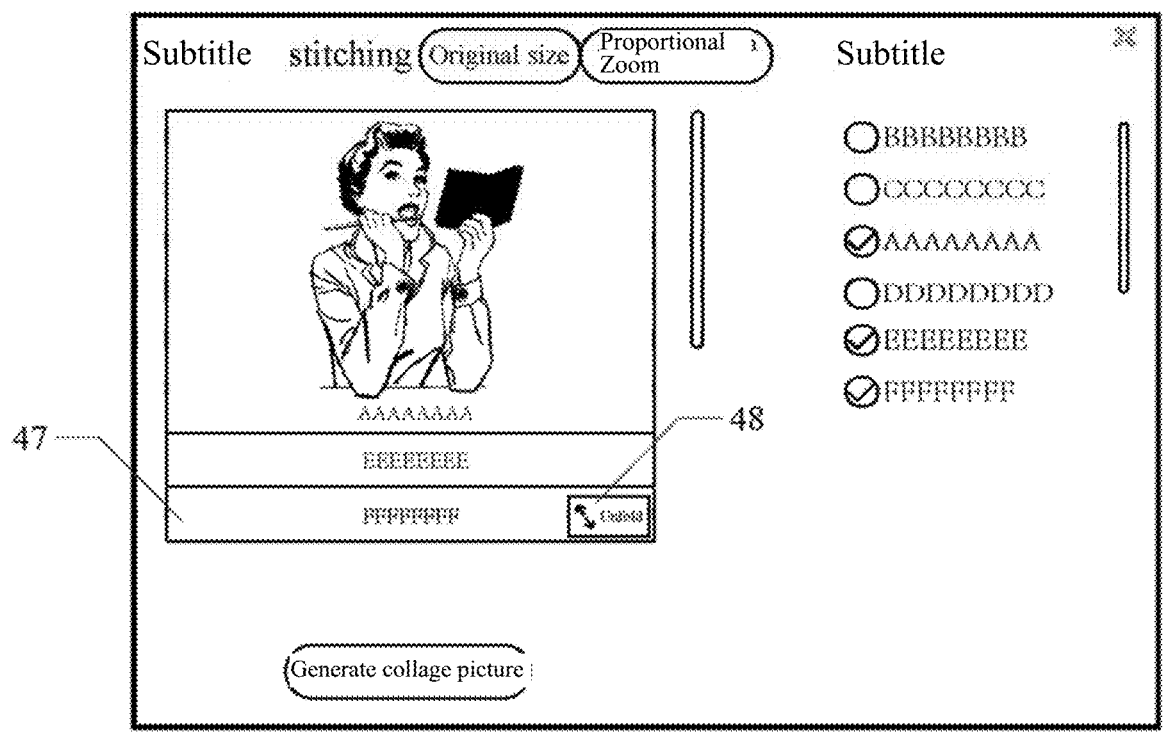
FIG. 7 and FIG. 8 are schematic diagrams of switching a display state of an image frame according to some embodiments of the present disclosure.
Figure 8:
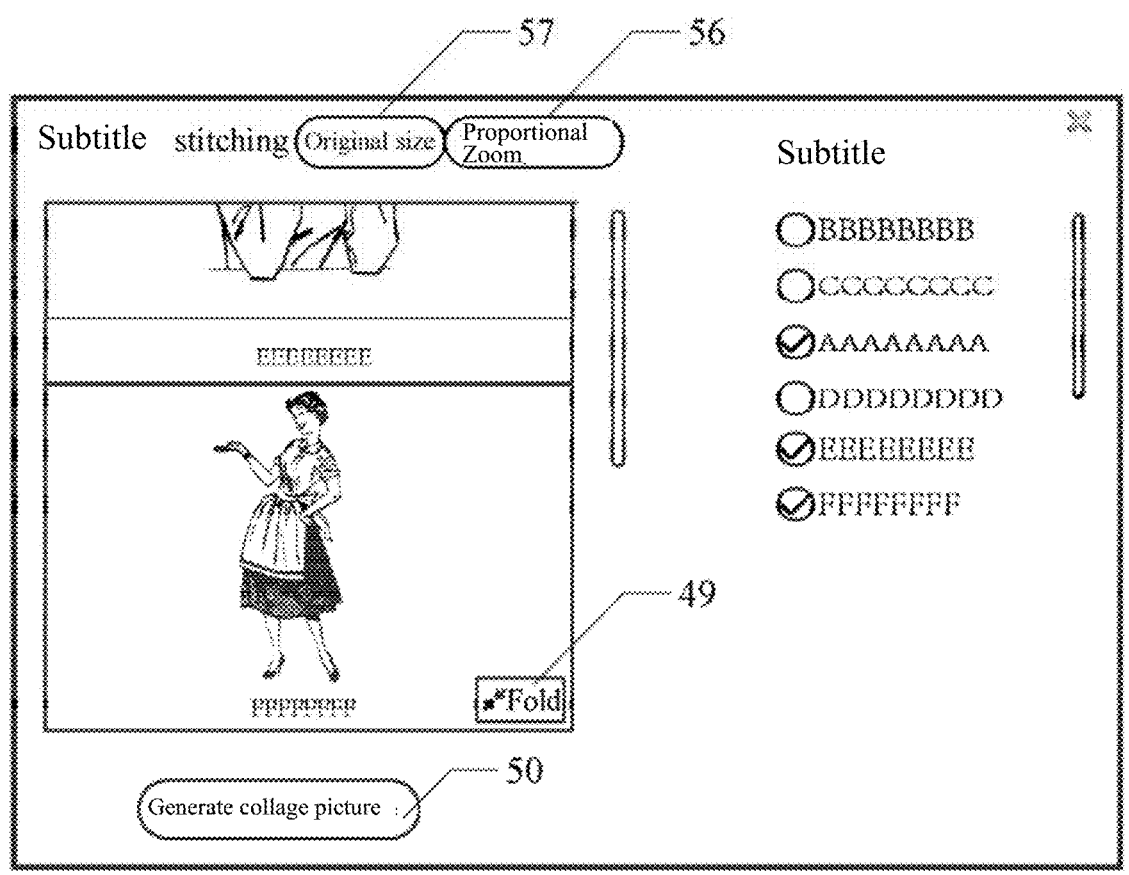

The display state switching instruction refers to an operation instruction triggered by the user and used for switching the display state of the image frame. In the embodiments of the present disclosure, the manner for triggering the display state switching instruction is not limited. For example, the instruction may be triggered in at least one manner of an operation control, a speech, a gesture, or an expression. Exemplarily, with reference to FIG. 7 and FIG. 8, in FIG. 7, an image frame 47 corresponding to a subtitle "FFFFFFFF" is in a folded state. As shown in FIG. 8, the user taps an "unfold" button 48 at the lower right corner of the image frame 47, and the terminal switches the image frame 47 from the folded state to an unfolded state for display. In addition, when the image frame 47 is in the unfolded state, if the user taps a "fold" button 49 at the lower right corner of the image frame 47, the terminal switches the image frame 47 from the unfolded state to the folded state for display.

In the embodiments of the present disclosure, collage pictures with different display forms may be generated by switching the display state of the image frame, and the user may adjust the display state of the image frame according to own requirements. In addition, the user may further review picture content in the image frame by unfolding the image frame.

In addition, in response to obtaining a deselection instruction corresponding to the target subtitle, the terminal cancels displaying of the target image frame in the stitching preview region. Optionally, if there is only one subtitle in the subtitle list is in a selected state, the user cannot cancel selection of the subtitle.

Step 204: Generate, in response to obtaining a picture generation instruction, a collage picture according to the target image frame included in the stitching preview region.

Figure 9:
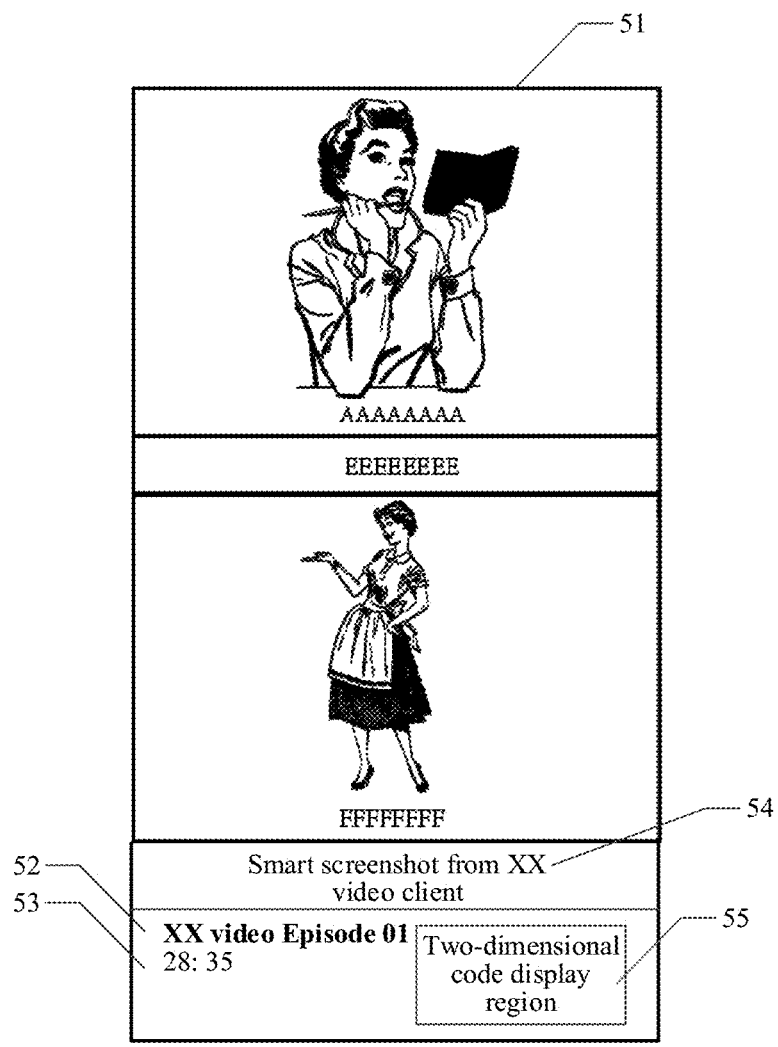
FIG. 9 is a schematic diagram of a collage picture according to some embodiments of the present disclosure.

The picture generation instruction refers to an instruction triggered by the user and used for instructing the terminal to generate a collage picture. In the embodiments of the present disclosure, the manner for triggering the picture generation instruction is not limited. For example, the instruction may be triggered in a manner such as an operation control, a speech, a gesture, or an expression. After obtaining the picture generation instruction, the terminal keeps respective current display states of the target image frames included in the stitching preview region to generate a collage picture. With reference to FIG. 8 and FIG. 9, after the user taps a "generate collage picture" button 50, the terminal generates a collage picture 51 shown in FIG. 9.

Optionally, when the user taps the "generate collage picture" button 50 to trigger a picture generation instruction, the terminal determines whether a user account is in a logged-in state; if the user account is not in the logged-in state, the terminal displays a login subtitle box that requires the user to perform a login operation of the user account, and generates a collage picture after the user account successfully logs in; and if the user account is in the logged-in state, the terminal directly performs the step of generating a collage picture.

Optionally, in addition to the target image frames included in the stitching preview region, the collage picture further includes related information of the target video. Optionally, as shown in FIG. 9, the related information of the target video includes at least one of the following: a name 52 of the target video, a screenshot timestamp 53 corresponding to the target video, source information 54 of the collage picture, or a two-dimensional code 55 corresponding to the collage picture. The screenshot timestamp 53 corresponding to the target video is a timestamp corresponding to a selected subtitle. For example, the screenshot timestamp may refer to a timestamp of an initial display moment corresponding to the subtitle provided with the earliest display period in selected subtitles. The source information 54 of the collage picture refers to information of a server side generating the collage picture. The two-dimensional code 55 corresponding to the collage picture carries a link address of a shared page of the collage picture and is used for being scanned by the user to obtain the link address, to display the shared page of the collage picture.

Based on the above, in the technical solution provided in the embodiments of the present disclosure, the subtitle list of the target video is displayed, the target image frame corresponding to the target subtitle is displayed in the stitching preview region after the selection instruction corresponding to the target subtitle in the subtitle list is obtained, and then the collage picture is generated according to the target image frame included in the stitching preview region. The solution is simple in operation and time-saving, and can ensure matching degrees between subtitles and video pictures in the collage picture. In the technical solution provided in the embodiments of the present disclosure, screenshot taking and splicing may alternatively be performed on a video playing interface without using third-party software.

In some optional embodiments provided based on the embodiment of FIG. 2, in response to obtaining a complete preview instruction, the terminal performs equal-proportion reduction (i.e., proportional reduction) processing on the target image frame included in the stitching preview region according to a total length of the target image frame included in the stitching preview region and a length of the stitching preview region, to obtain a processed target image frame; and then displays the processed target image frame in the stitching preview region. A total length of the processed target image frame is less than or equal to the length of the stitching preview region. For example, the stitching preview region includes a plurality of target image frames, in response to the complete preview instruction, the terminal scales down the target image frames in the stitching preview region according to a total length of the target image frames and a length of the stitching preview region, to obtain scaled-down target image frames. The terminal then displays the scaled-down target image frames in the stitching preview region.

In the stitching preview region, a transverse width of each target image frame may be a preset value, and a longitudinal length may be determined according to a length-width ratio of the target image frame, to ensure that the length-width ratio of the target image frame in the stitching preview region is consistent with the length-width ratio when the target image frame is played. Since a size of the stitching preview region is limited, when more target image frames are selected by the user and added to the stitching preview region, the target image frames cannot be displayed simultaneously in the stitching preview region, so that the target image frames are displayed in the stitching preview region in a scrolling to preview manner. When the user needs to completely preview all target image frames included in the stitching preview region, the user may trigger a complete preview instruction. For example, the user may trigger the complete preview instruction in at least one manner of an operation control, a speech, a gesture, or an expression. After receiving the complete preview instruction, the terminal performs reduction processing, such as equal-proportion reduction processing, on the target image frames included in the stitching preview region, so that all target image frames included in the stitching preview region can be displayed completely.

Figure 10:
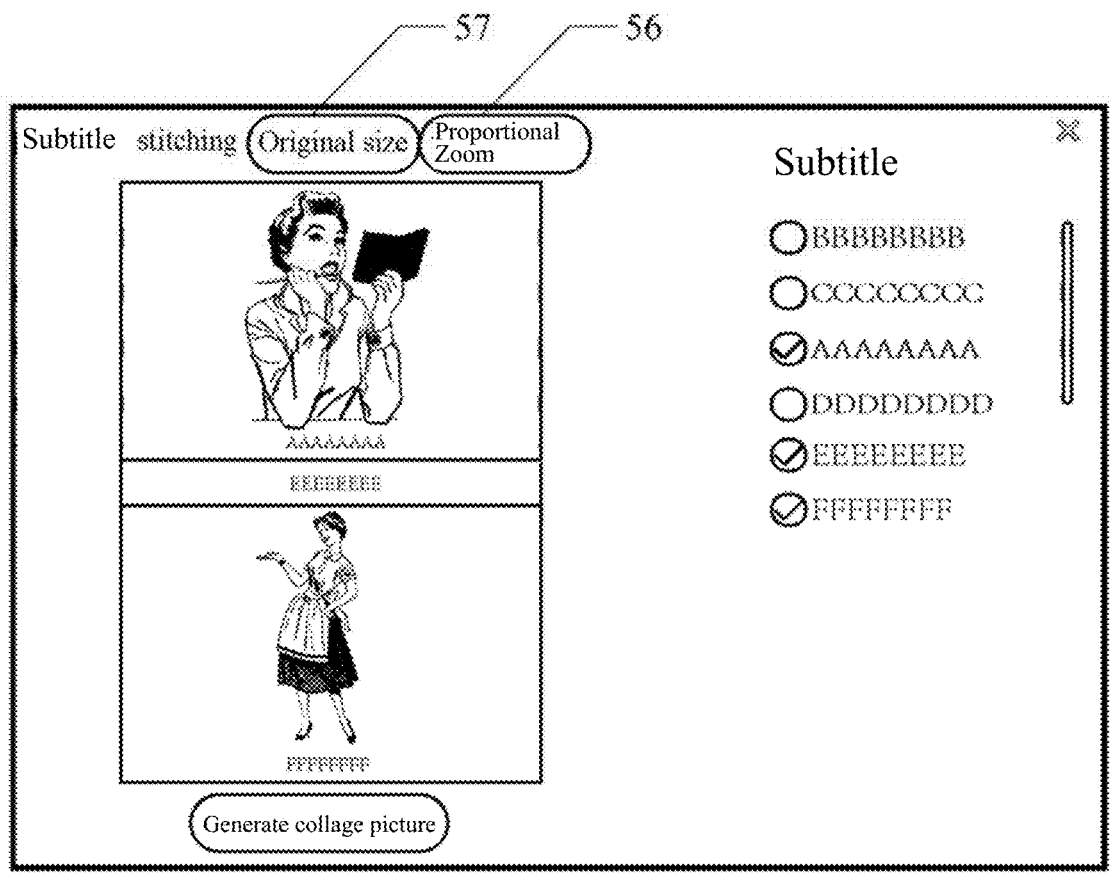
FIG. 10 is a schematic diagram of a full preview of an image frame according to some embodiments of the present disclosure.

Exemplarily, with reference to FIG. 8 and FIG. 10, the subtitle stitching interface further includes an "proportional zoom" button 56. The user taps the "proportional zoom" button 56 to trigger the complete preview instruction. As shown in FIG. 10, the terminal reduces the total length of the target image frames included in the stitching preview region to be consistent with the length of the stitching preview region, and performs equal-proportion reduction on the width, so that the user can view an overall arrangement layout of all selected target image frames in the stitching preview region.

In addition, after displaying the processed target image frames in the stitching preview region, in response to obtaining an instruction of exiting the complete preview instruction, the terminal restores the processed target image frames in the stitching preview region to patterns before the processing for display. With reference to FIG. 8 and FIG. 10, the subtitle stitching interface further includes an "original size" button 57. The user taps the "original size" button 57 to trigger the instruction of exiting the complete preview, and the terminal restores the image frames in the stitching preview region from patterns in FIG. 10 to patterns in FIG. 8 for display.

Based on the above, in the technical solution provided in the embodiments of the present disclosure, a function of completely previewing the target image frames in the stitching preview region is provided, so that the user can view the overall arrangement layout of all selected target image frames in the stitching preview region, thereby better meeting the user requirement.

In some other optional embodiments based on the embodiment of FIG. 2 or provided by the foregoing optional embodiments, functions of saving and sharing the collage picture are further provided.

Figure 11:
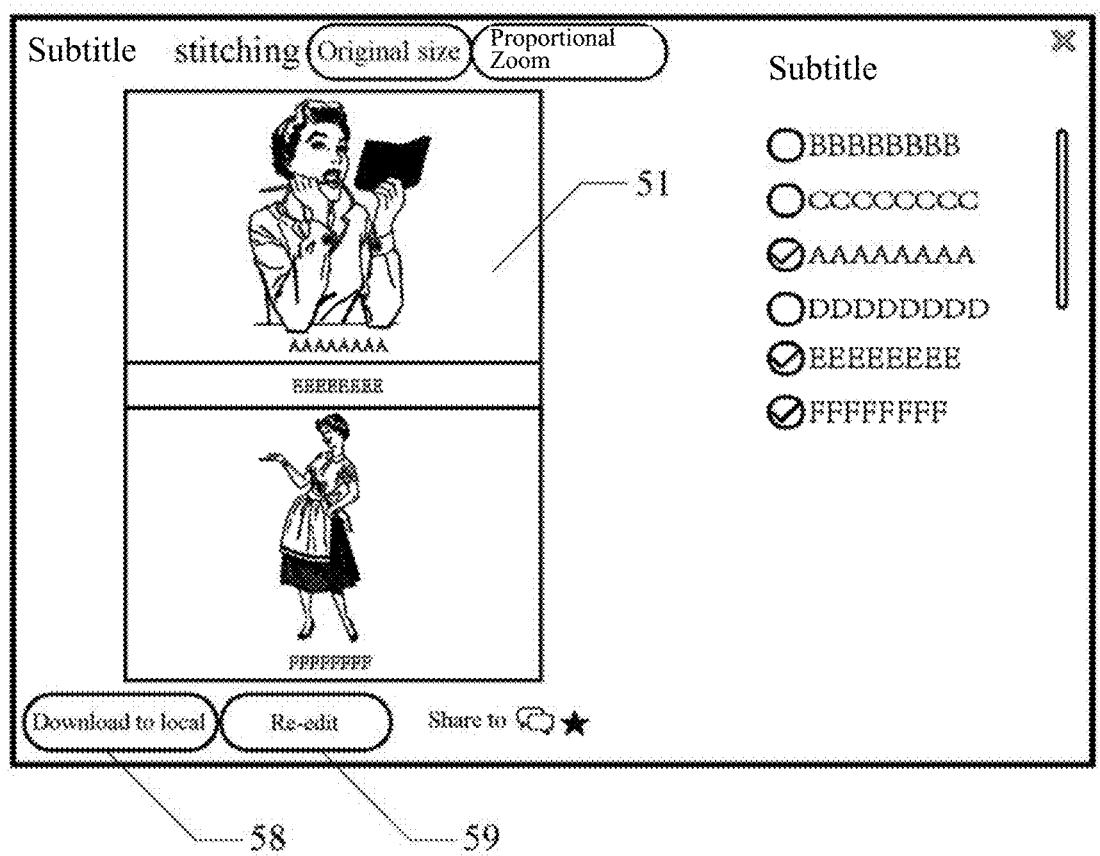
FIG. 11 is a schematic diagram of a saving and sharing interface according to some embodiments of the present disclosure.

With reference to FIG. 8 and FIG. 11, the user taps the "generate collage picture" button 50 to trigger a picture generation instruction, and the terminal generates a collage picture 51 and displays the collage picture 51 in the stitching preview region. After the collage picture 51 is generated, an operation control used for implementing at least one function of saving, sharing, or re-editing appears in the subtitle stitching interface. As shown in FIG. 11, the subtitle stitching interface includes a "download to local" button 58, a "re-edit" button 59, and related buttons for sharing the collage picture to Weibo or other social application platforms.

The user taps the "download to local" button 58 to trigger a save instruction, and the terminal displays a subtitle box for the user to select a save position. The user selects the save position according to own requirement, and the terminal saves the collage picture to a corresponding position.

The user taps the "re-edit" button 59 to trigger a re-editing instruction, the terminal returns to the subtitle stitching interface shown in FIG. 8, and the user may reselect the target subtitle or adjust the display state of the target image frame according to own requirement.

The user taps a share button corresponding to a target platform to trigger a share instruction, and the terminal transmits the collage picture to other users in the target platform according to the user requirement.

Figure 12:
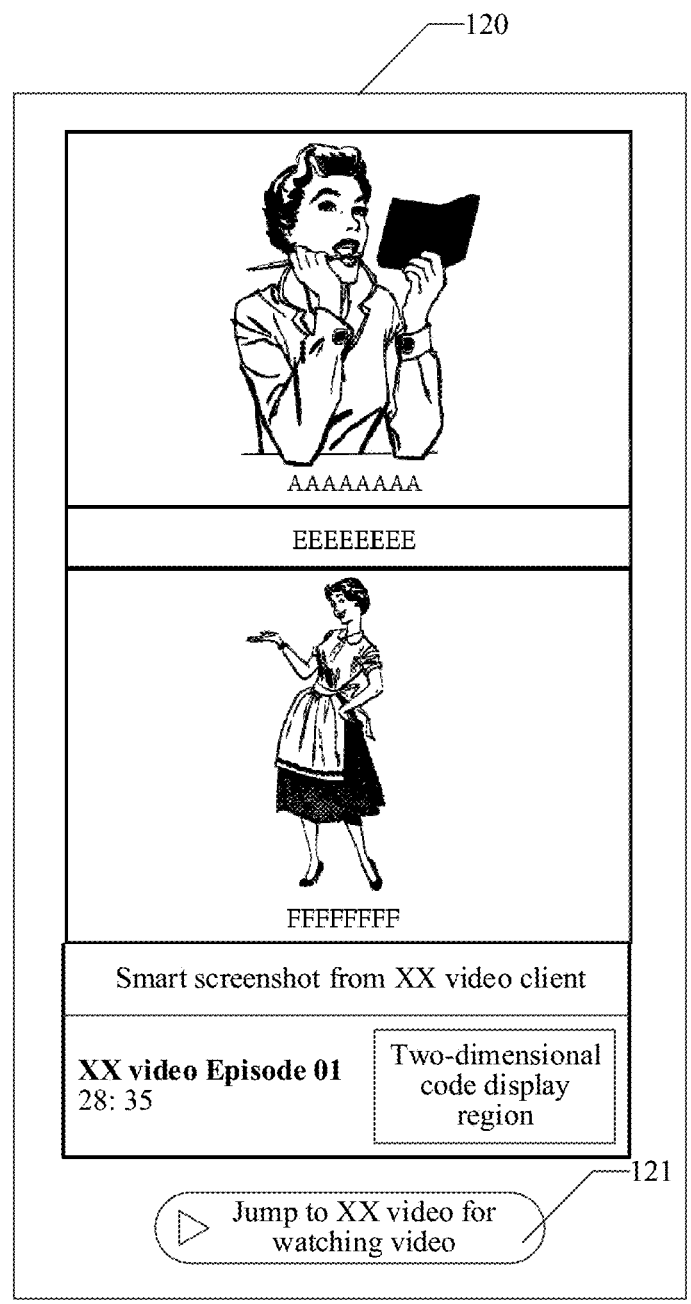
FIG. 12 is a schematic diagram of a web page of a mobile terminal according to some embodiments of the present disclosure.

As shown in FIG. 12, when a shared user receives the collage picture or a shared link transmitted by the sharer on a terminal such as a mobile phone (or other mobile devices), the shared user may open a web page 120 of the mobile terminal by scanning the two-dimensional code of the collage picture or tapping the shared link on the mobile phone. The shared user may watch the target video by tapping a control used for watching a video on the web page 120 of the mobile terminal, such as a "video watching" button 121. Optionally, the shared user needs to open a client or a web page corresponding to an XX video when watching the target video. If the client corresponding to the XX video is installed in the mobile phone of the shared user, after the shared user taps the "video watching" button 121, the mobile phone automatically opens the client corresponding to the XX video for the user to watch the target video; and if the client corresponding to the XX video is not installed in the mobile phone of the shared user, after the shared user taps the "video watching" button 121, the mobile phone jumps to the web page corresponding to the XX video for the shared user to watch the target video.

Figure 13:
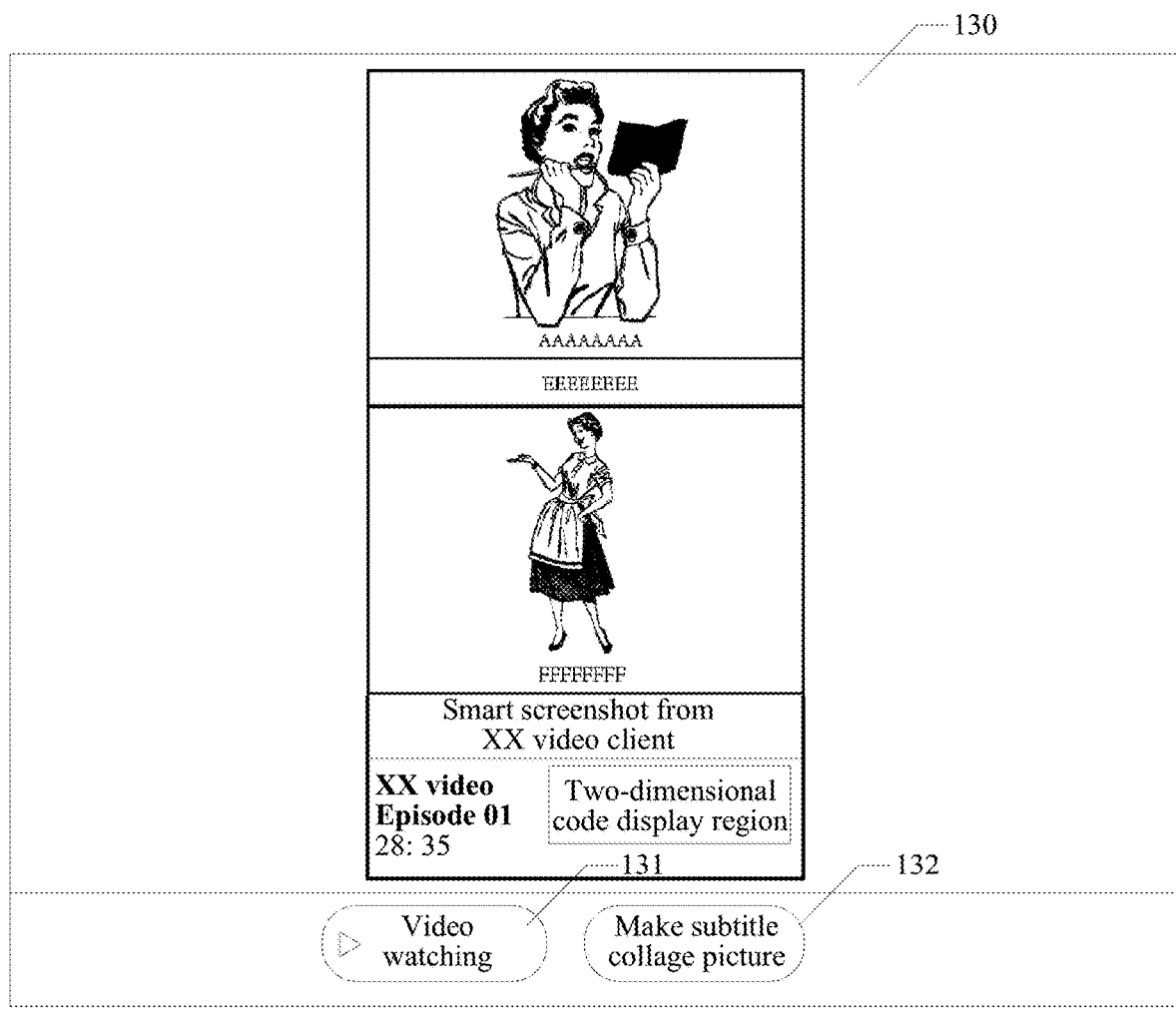
FIG. 13 is a schematic diagram of a web page of a PC terminal according to some embodiments of the present disclosure.

As shown in FIG. 13, when the shared user receives the collage picture or the shared link transmitted by the sharer on a PC, the shared user opens a web page 130 of the PC terminal. The shared user may watch the target video by tapping a "video watching" button 131. Optionally, the shared user needs to open a client or a web page corresponding to an XX video when watching the target video. If the client corresponding to the XX video is installed in the PC of the shared user, after the shared user taps the "video watching" button 131, the PC automatically opens the client corresponding to the XX video for the user to watch the target video; and if the client corresponding to the XX video is not installed in the PC of the shared user, after the shared user taps the "video watching" button 131, the PC jumps to the web page corresponding to the XX video for the shared user to watch the target video. In addition, the web page 130 may further include a "make subtitle collage picture" button 132, and after tapping the "make subtitle collage picture" button 132, the shared user may also make a subtitle collage picture in the manner described above.

Figure 14:
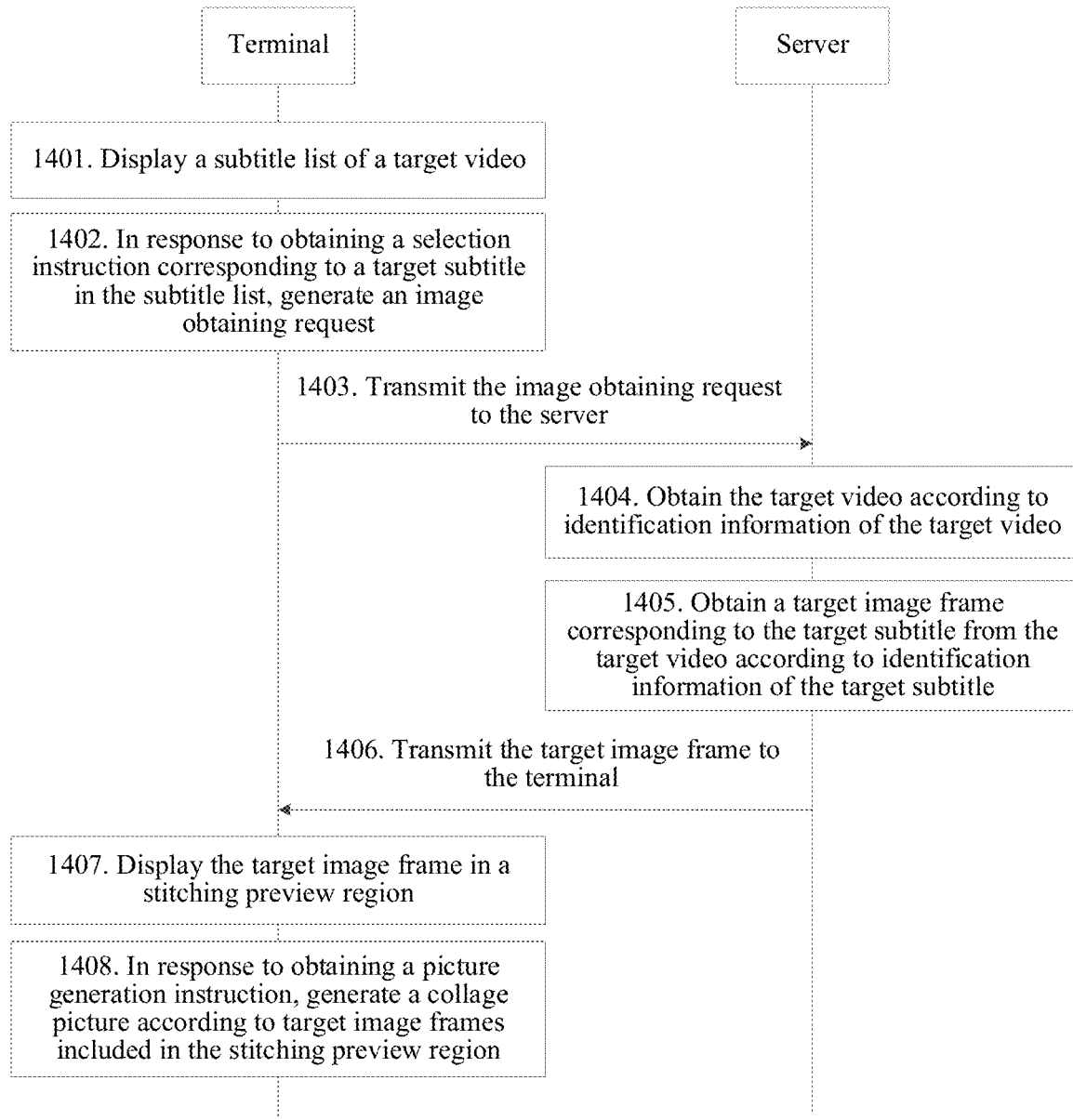
FIG. 14 is a flowchart of a picture generation method according to some other embodiments of the present disclosure.

FIG. 14 shows a flowchart of a picture generation method according to some other embodiments of the present disclosure. The method is performed by an interaction between a terminal and a server, the terminal may be the terminal 10 in the embodiment of FIG. 1, and the server may be the server 20 in the embodiment of FIG. 1. The method may include the following steps:

Step 1401: A terminal displays a subtitle list of a target video.

Step 1402: In response to obtaining a selection instruction corresponding to a target subtitle in the subtitle list, the terminal generates an image obtaining request.

The image obtaining request is used for requesting to obtain a target image frame corresponding to the target subtitle. Optionally, the image obtaining request includes identification information of the target video and identification information of the target subtitle.

Step 1403: The terminal transmits the image obtaining request to a server.

Step 1404: The server obtains the target video according to the identification information of the target video.

The server may search a video library and obtain the target video according to the identification information of the target video. The video library may be a database or a server used for saving videos.

Step 1405: The server obtains a target image frame corresponding to the target subtitle from the target video according to the identification information of the target subtitle.

The target image frame refers to an image frame within a display period corresponding to the target subtitle. Optionally, the target image frame is one image frame within the display period corresponding to the target subtitle. For example, the target image frame may be the first image frame within the display period corresponding to the target subtitle, or may be the last image frame within the display period corresponding to the target subtitle, or may be any image frame within the display period corresponding to the target subtitle. Which image frame within the display period corresponding to the target subtitle is selected as the target image frame may be preset by the designer or the user. This is not limited in the embodiments of the present disclosure.

Step 1406: The server transmits the target image frame to the terminal.

Step 1407: The terminal displays the target image frame in a stitching preview region.

Step 1408: In response to obtaining a picture generation instruction, the terminal generates a collage picture according to the target image frame included in the stitching preview region.

Optionally, after step 1408, the method further includes the following step: the terminal transmits the collage picture to the server, and the server saves the collage picture. After generating the collage picture, the terminal may transmit the collage picture to the server for backup and saving, so as to provide, when receiving a shared page of the collage picture requested from the server by another terminal according to a link address, the shared page of the collage picture to the another terminal.

For details not disclosed in this embodiment in detail, reference may be made to the descriptions in the foregoing embodiment.

In addition, in some embodiments, the technical solution of the present disclosure is only described from the perspective of the interaction between the terminal and the server. The steps related to the terminal side may be independently implemented as a picture generation method of the terminal side, and the steps related to the server side may be independently implemented as a picture generation method of the server side.

Figure 15:
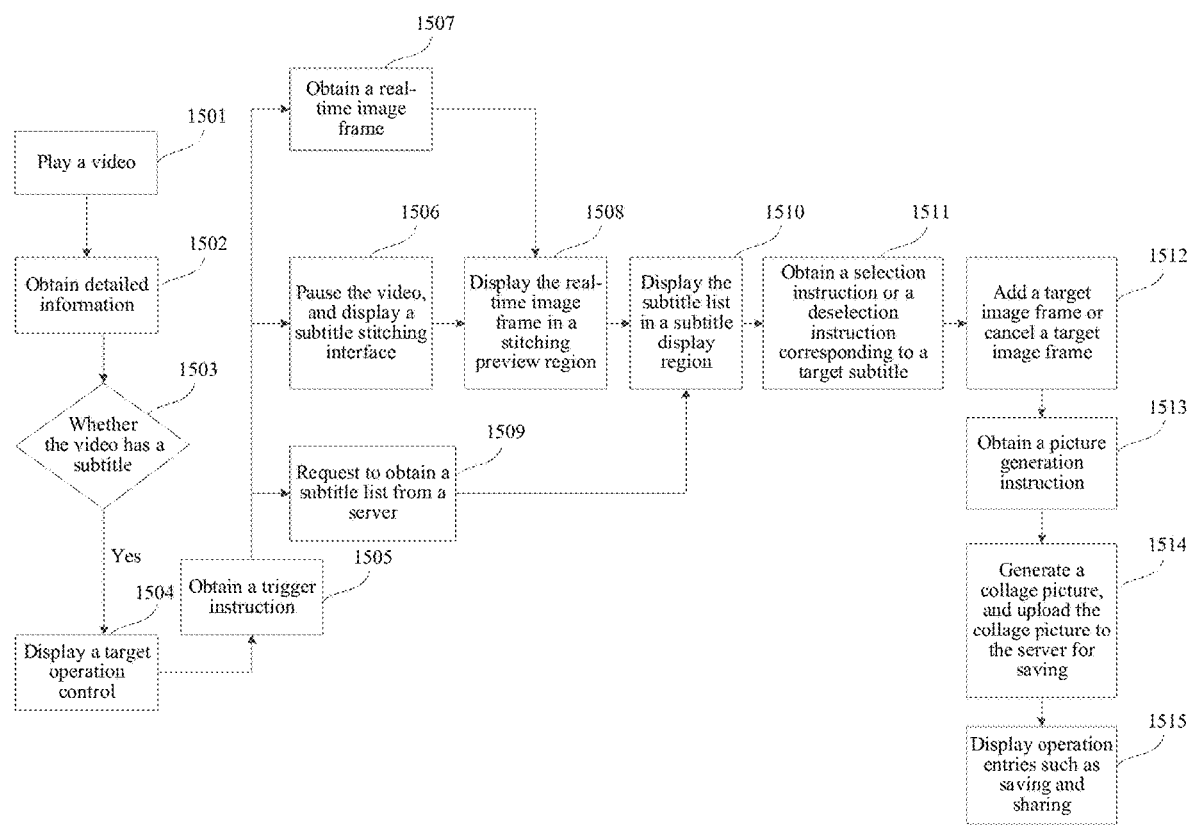
FIG. 15 is a flowchart of a picture generation method according to some other embodiments of the present disclosure.

FIG. 15 shows a flowchart of a picture generation method according to some other embodiments of the present disclosure. The method is performed by a terminal, and the terminal may be the terminal 10 in the embodiment of FIG. 1. The method may include the following steps:

Step 1501: A terminal plays a target video.

Step 1502: The terminal obtains detailed information of the target video.

Step 1503: The terminal detects, according to the detailed information of the target video, whether the target video has a subtitle, and if yes, step 1504 is performed.

Step 1504: The terminal displays a target operation control in a playing interface of the target video. For example, the target operation control is the "subtitle stitching" button described above.

Step 1505: The terminal obtains a trigger instruction corresponding to the target operation control.

Step 1506: The terminal pauses the target video and displays a subtitle stitching interface, the subtitle stitching interface including a subtitle display region and a stitching preview region.

Step 1507: The terminal obtains a real-time image frame of the target video.

Step 1508: The terminal adds and displays the real-time image frame in the stitching preview region.

Step 1509: The terminal requests to obtain a subtitle list of the target video from a server.

Step 1510: The terminal displays the subtitle list of the target video in the subtitle display region.

Step 1511: The terminal obtains a selection instruction or a deselection instruction corresponding to a target subtitle.

Step 1512: The terminal adds and displays a target image frame corresponding to the target subtitle according to the selection instruction, or cancels displaying of a target image frame corresponding to the target subtitle according to the deselection instruction.

Step 1513: The terminal obtains a picture generation instruction.

Step 1514: The terminal generates a collage picture according to image frames included in the stitching preview region, and uploads the collage picture to the server for saving.

Step 1515: The terminal displays operation entries such as saving and sharing.

Figure 16:
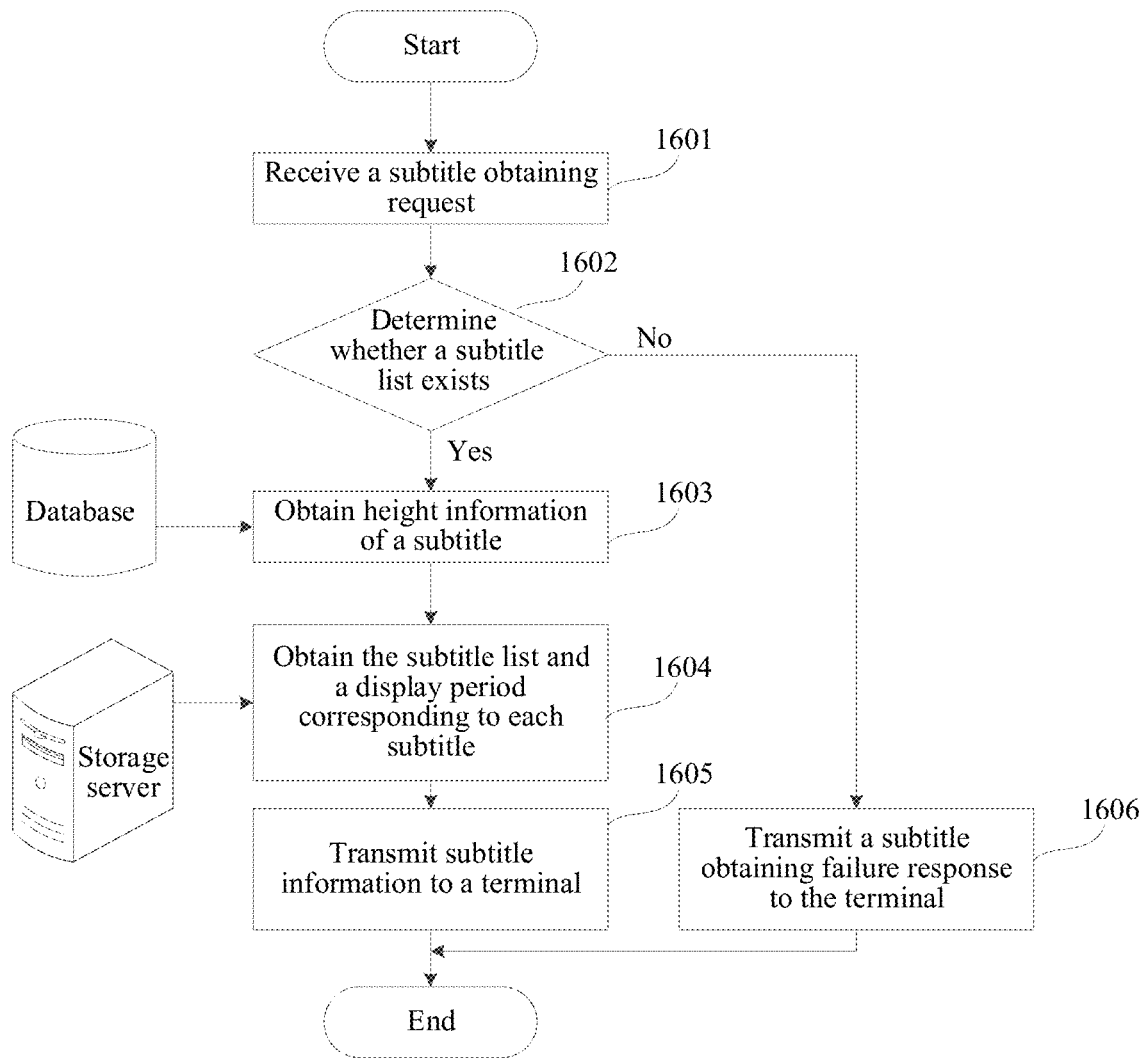
FIG. 16 is a schematic flowchart of a server side according to some embodiments of the present disclosure.

FIG. 16 shows a schematic flowchart of a server side after the server receives a subtitle obtaining request transmitted by a terminal, and the server may be the server 20 in the embodiment of FIG. 1.

Step 1601: A server receives a subtitle obtaining request transmitted by a terminal, where the subtitle obtaining request is used for requesting to obtain a subtitle list of a target video, and the subtitle obtaining request may carry identification information of the target video.

Step 1602: The server determines whether the subtitle list exists in the target video, if yes, step 1603 is performed; otherwise, step 1606 is performed.

Step 1603: The server obtains height information of a subtitle of the target video, where the height information of the subtitle is used for indicating a position of the subtitle in an image frame, so as to ensure that the subtitle is visible to a user when the terminal displays the image frame in a folded state. Optionally, the server searches a database for the height information of the subtitle of the target video.

Step 1604: The server obtains the subtitle list of the target video and a display period corresponding to each subtitle. Optionally, the server invokes an interface provided by a storage server configured to store subtitle information, to obtain the subtitle list of the target video and the display period corresponding to each subtitle from the storage server, where the display period may be represented by using a timestamp when the displaying of the subtitle is started and a timestamp when the displaying of the subtitle is ended.

Step 1605: The server transmits the subtitle information of the target video to the terminal, the subtitle information including the subtitle list of the target video, the display period corresponding to each subtitle, and the height information of the subtitle.

Step 1606: The server transmits a subtitle obtaining failure response to the terminal.

Figure 17:
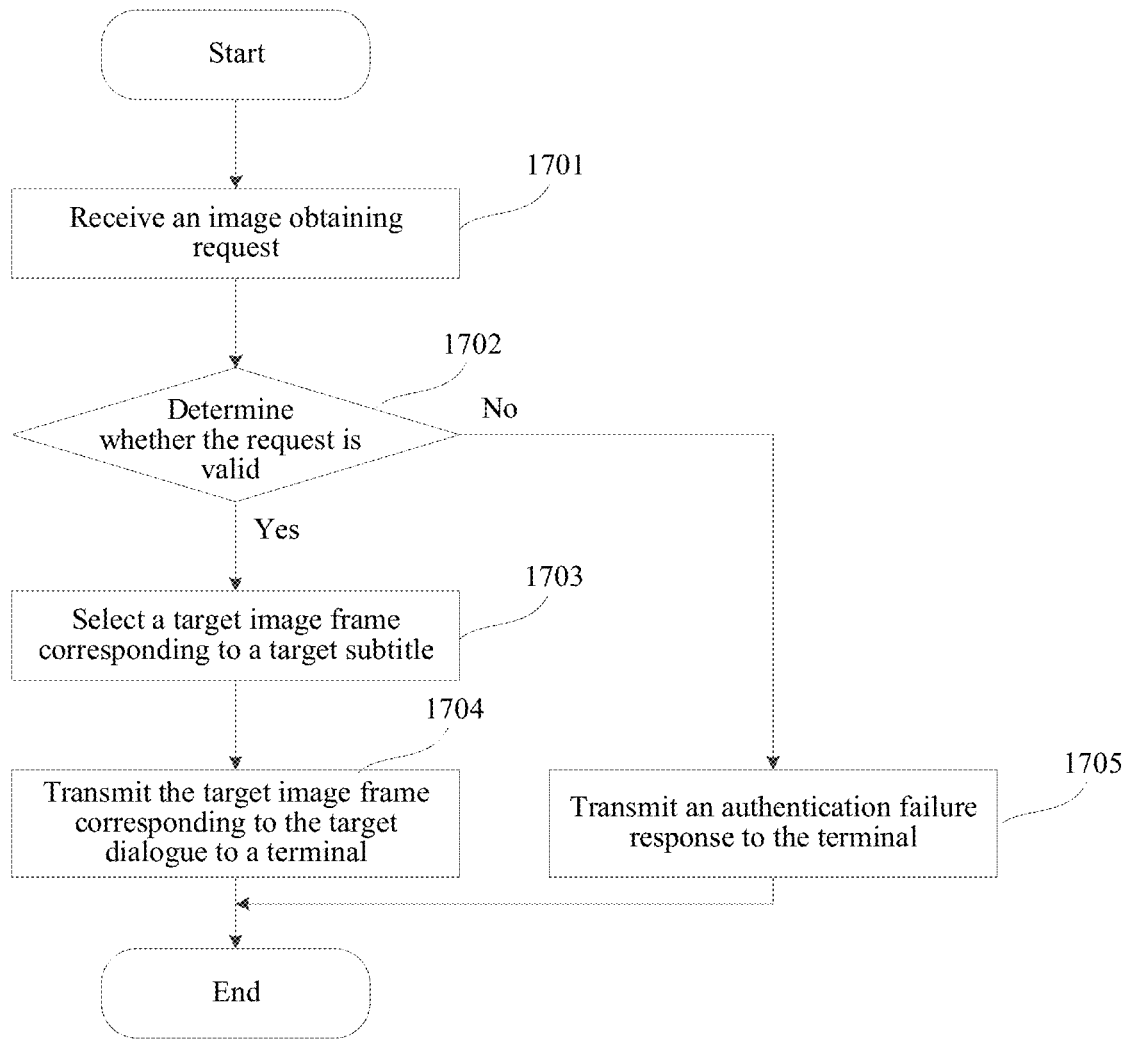
FIG. 17 is a schematic flowchart a server side according to some other embodiments of the present disclosure.

FIG. 17 shows a schematic flowchart of a server side after the server receives an image obtaining request transmitted by a terminal, and the server may be the server 20 in the embodiment of FIG. 1.

Step 1701: A server receives an image obtaining request transmitted by a terminal, the image obtaining request carrying identification information of a target video and identification information of a target subtitle.

Step 1702: The server performs authentication on the image obtaining request, to determine whether the image obtaining request is valid, if the image obtaining request is valid, step 1703 is performed; otherwise, step 1705 is performed.

Step 1703: The server selects a target image frame corresponding to the target subtitle from the target video.

Step 1704: The server transmits the target image frame corresponding to the target subtitle to the terminal.

Step 1705: The server transmits an authentication failure response to the terminal.

It is to be understood that, the steps of the embodiments of the present disclosure are not necessarily performed according to a sequence indicated by step numbers. Unless explicitly specified in this specification, the sequence for performing the steps is not strictly limited, and the steps may be performed in other sequences. In addition, at least some of the steps in the embodiments may include a plurality of sub-steps or a plurality of stages. These sub-steps or stages are not necessarily performed at the same moment, but may be performed at different moments. These sub-steps or stages are not necessarily performed sequentially, but may be performed by turns or alternately with other steps or at least some sub-steps or stages of other steps.

An application program used for implementing product functions of the terminal side of the present disclosure may adopt a model view controller (MVC) architecture, including the following three layers: a presentation layer, a control layer, and a data layer.

Figure 18:
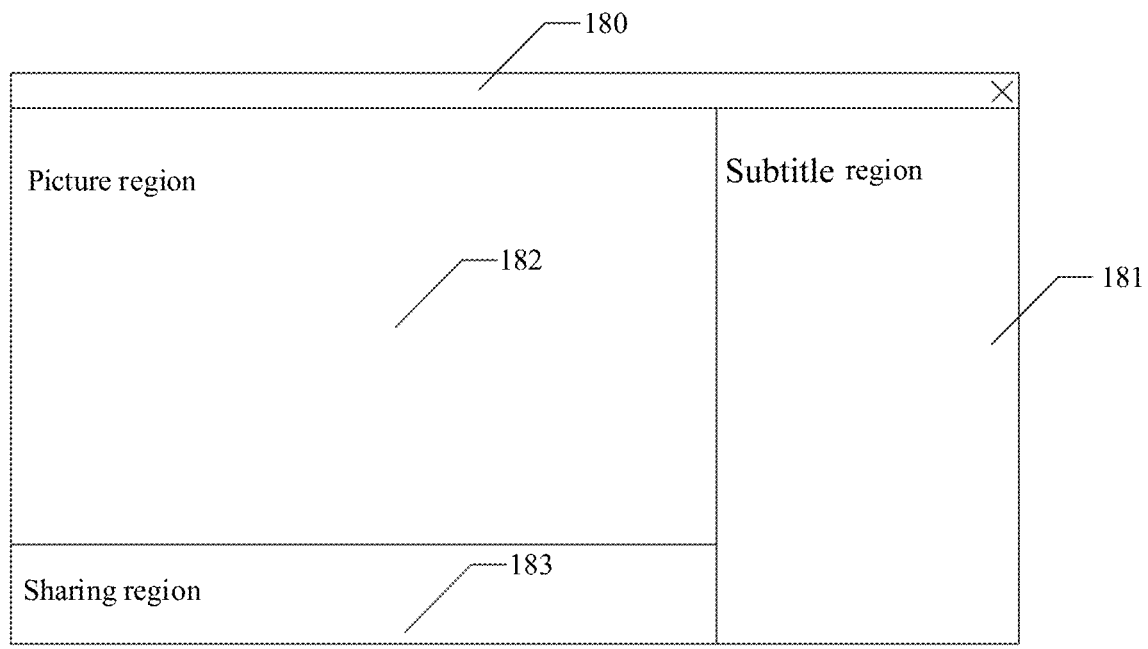
FIG. 18 is a schematic diagram of a UI display framework according to some embodiments of the present disclosure.

The presentation layer is a user interface (UI) presentation framework. FIG. 18 shows a UI presentation framework corresponding to a subtitle stitching interface 180, and the UI presentation framework may include the following three parts: a subtitle region 181, a picture region 182, and a sharing region 183.

Figure 19:
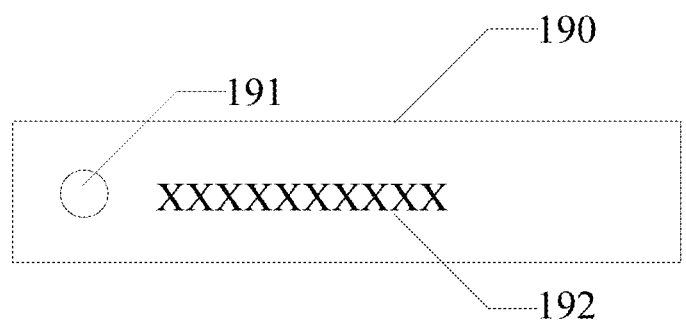
FIG. 19 is a schematic diagram of a content framework of a subtitle list according to some embodiments of the present disclosure.

Optionally, the subtitle region includes a subtitle list, and the subtitle list includes several content frameworks. As shown in FIG. 19, each content framework 190 includes a selection control 191 and a subtitle text 192.

A quantity of content frameworks included in the subtitle list is determined according to a quantity of subtitles included in the target video. The user may select or deselect a corresponding subtitle by tapping the selection control in the subtitle list. After the user selects a target subtitle, a target image frame corresponding to the target subtitle is added to and displayed in the picture region.

Figure 20:
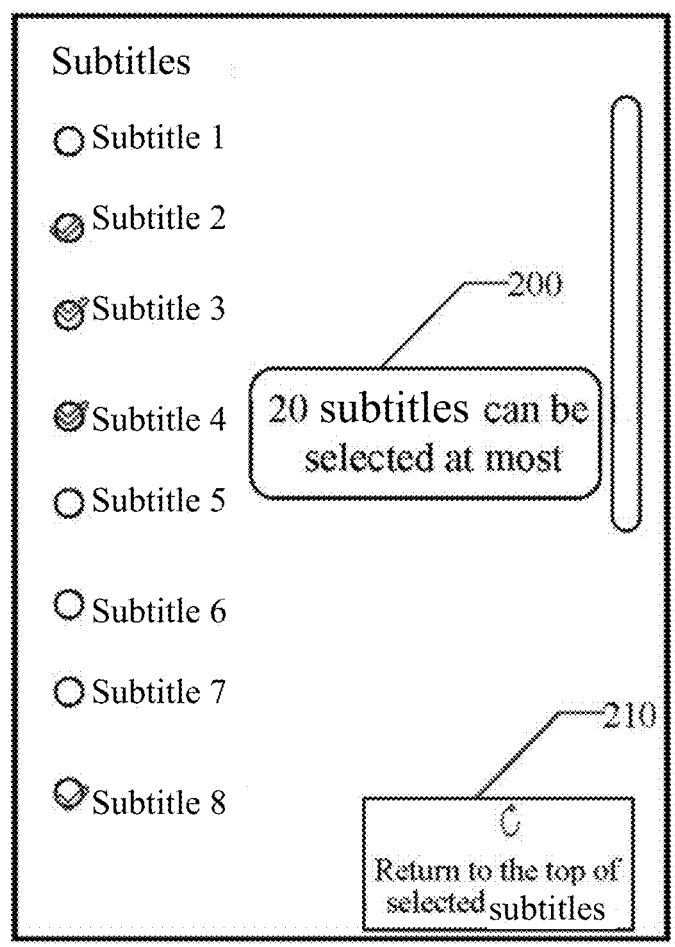
FIG. 20 is a schematic diagram of a subtitle region according to some embodiments of the present disclosure.

In addition, the subtitle region may further include the following two elements: a prompt box and a return control. As shown in FIG. 20, when a quantity of selected subtitles in the subtitle list exceeds a quantity set by a program, the prompt box 200 is displayed in the subtitle region. In addition, the return control 210 may be further displayed at the lower right corner of the subtitle region, for triggering to return to the top of the selected subtitles.

Figure 21:
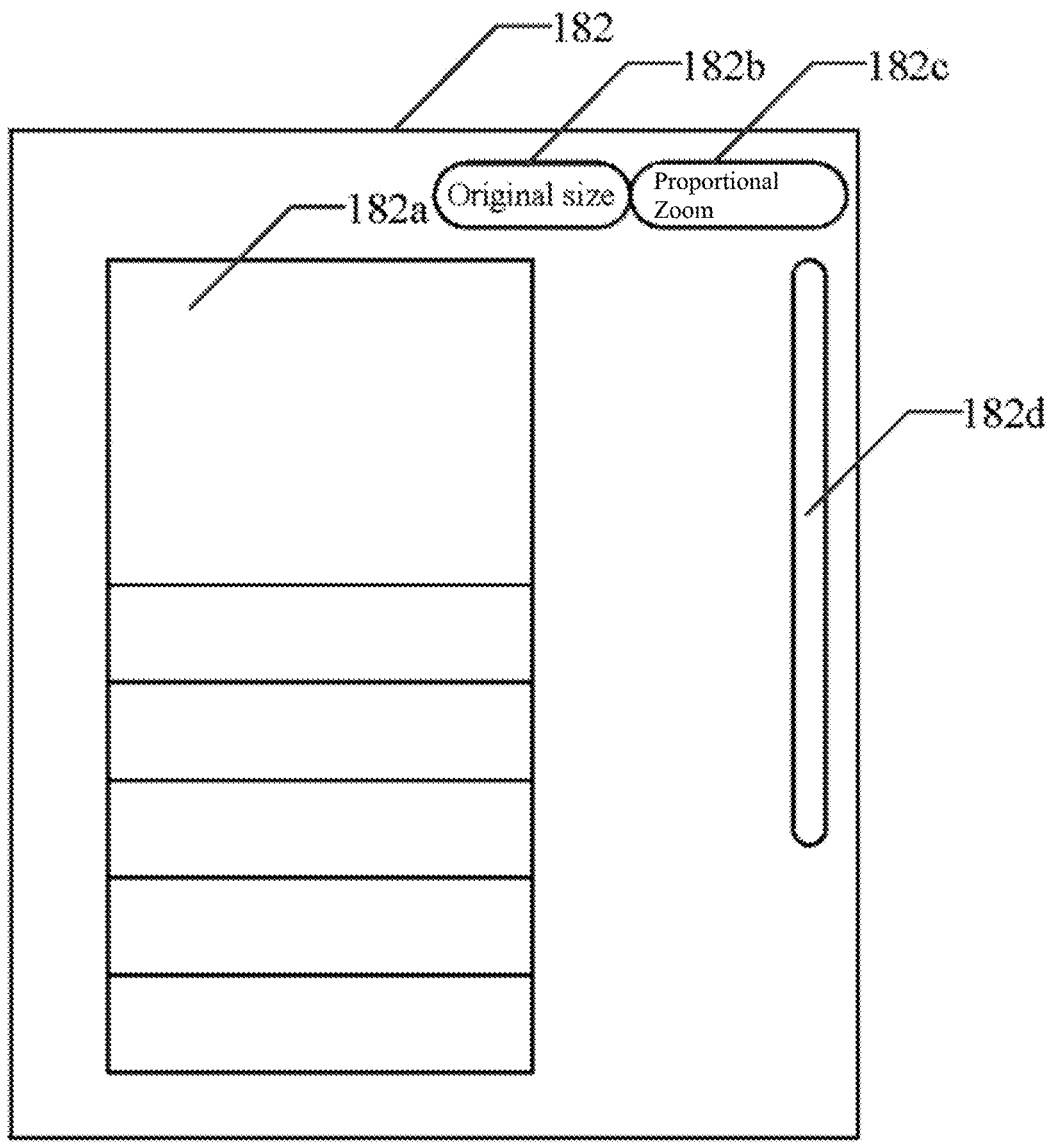
FIG. 21 is a schematic diagram of a picture region according to some embodiments of the present disclosure.

As shown in FIG. 21, the picture region 182 may include: a stitching preview region 182a, an "original size" button 182b, an "proportional zoom" button 182c, and a vertical scroll bar 182d. The stitching preview region 182a displays a content framework list formed by overlaying a plurality of picture controls. When the height of the content framework list is less than the height of the stitching preview region 182a, the vertical scroll bar 182d is automatically hidden; otherwise, the vertical scroll bar 182d may appear and provide a scroll operation to locate the content framework list to a corresponding position.

The "original size" button 182b and the "proportional zoom" button 182c provide a function of previewing a combination effect of current picture layers for the user. When excessive pictures are selected by the user, leading to that the longitudinal length of the content framework list exceeds the longitudinal length of the stitching preview region 182a, the vertical scroll bar 182d needs to be used to scroll to preview, which is difficult for the user to intuitively feel an overall splicing effect. After the "original size" button 182b and the "proportional zoom" button 182c are provided, when the user taps the "proportional zoom" button 182c, the terminal reduces the overall content framework list until the length is equal to the length of the stitching preview region 182a; and after the user taps the "original size" button 182b, the content framework list restores to the effect before the "proportional zoom" button 182c is tapped.

Each time when a target subtitle is added to or deleted from the subtitle list, the terminal notifies the picture region, and the picture region simplifies the operation as: performing an operation of newly adding a picture layer or deleting a picture layer for an $n^{th}$ selected target subtitle in the subtitle list. When a picture layer is newly added, a content framework container is newly built to display a corresponding target image frame, and whether an initial display state is an unfolded state is determined, where a real-time image frame is generally in an unfolded state by default. After the picture layer is newly built, the newly built picture layer is inserted into the existing content framework list according to a sequence of a subtitle option corresponding to the picture layer, and a presentation sequence of the image frame herein is consistent with a sequence of the subtitle in the subtitle list.

The sharing region is used for saving or sharing the generated collage picture. Optionally, the sharing region includes a "download to local" button, a "re-edit" button, and a row of shareable icon lists. Icon buttons on the shareable icon list correspond to sharing platforms.

The data layer is mainly responsible for storing data, such as identification information of a target video, a subtitle list of the target video, height information of a subtitle, a display period corresponding to each subtitle, and a target image frame. The subtitle list of the target video is provided by the server for the terminal. When the data layer performs processing on the target video, a screenshot timestamp corresponding the target video needs to be located, so as to locate the screenshot timestamp corresponding to the target video when the UI layer displays the target video. After data is requested and processed completely, the data is encapsulated into structural information, and the structural information is transmitted to the control layer.

The control layer may use CDialogueEditMgr as a control class, including a data class IDialogueInfoDetail and an interface class CDialogueEditWindow. The CDialogueEditMar used as the control class functions as a bridge between the data class and a presentation class, to combine functions of the two classes, and encapsulate the functions into a class for an outer call. In this way, logic and interfaces are well separated, and the control class obtains data from the data class and transmits the data to the presentation class for interface presentation.

When the terminal starts to share the subtitle, the control layer is responsible for creating a function window and starts a data request, after the data request is completed, a notification is returned to the control layer, and the control layer is then responsible for transmitting the data to the UI layer and instructs the UI layer to draw interface information. Screenshot response of a kernel of a local player also instructs, through the control layer, the UI layer to display a real-time image frame corresponding to the target video.

The following is an apparatus embodiment of the present disclosure that can be used for performing the method embodiments of the present disclosure. For details not disclosed in the apparatus embodiment of the present disclosure, refer to the method embodiments of the present disclosure.

Figure 22:
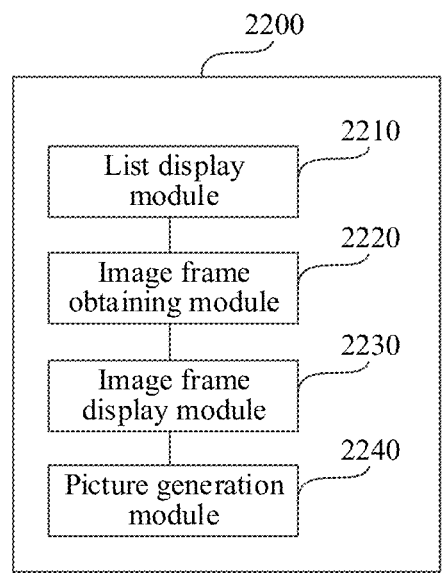
FIG. 22 is a block diagram of a picture generation apparatus according to some embodiments of the present disclosure.

FIG. 22 shows a block diagram of a picture generation apparatus according to some embodiments of the present disclosure. The apparatus has a function of performing the foregoing method examples of the terminal side, and the function may be implemented by hardware or may be implemented by hardware executing corresponding software. The apparatus may be the terminal 10 in FIG. 1, or may be disposed on the terminal 10. The apparatus 2200 may include: a list display module 2210, an image frame obtaining module 2220, an image frame display module 2230, and a picture generation module 2240.

The list display module 2210 is configured to display a subtitle list of a target video, the subtitle list including at least one subtitle.

The image frame obtaining module 2220 is configured to obtain, in response to obtaining a selection instruction corresponding to a target subtitle in the subtitle list, a target image frame corresponding to the target subtitle in the target video, the target image frame being an image frame within a display period corresponding to the target subtitle.

The image frame display module 2230 is configured to display the target image frame in a stitching preview region.

The picture generation module 2240 is configured to generate, in response to obtaining a picture generation instruction, a collage picture according to the target image frame included in the stitching preview region.

Based on the above, in the technical solution provided in the embodiments of the present disclosure, the subtitle list of the target video is displayed, the target image frame corresponding to the target subtitle is displayed in the stitching preview region after the selection instruction corresponding to the target subtitle in the subtitle list is obtained, and then the collage picture is generated according to the target image frame included in the stitching preview region. By using this solution, no third-party software is required to perform screenshot taking and splicing. The solution is simple in operation and time-saving, and can ensure matching degrees between subtitles and video pictures in the collage picture.

In some optional embodiments provided based on the embodiment of FIG. 22, the list display module 2210 is configured to:

display a playing interface of the target video;

obtain a trigger instruction corresponding to a target operation control in the playing interface;

obtain a real-time image frame of the target video according to the trigger instruction, the real-time image frame being an image frame displayed in the playing interface when the trigger instruction is obtained;

display a subtitle stitching interface, the subtitle stitching interface including a subtitle display region and the stitching preview region; and display the subtitle list of the target video in the subtitle display region, and display the real-time image frame in the stitching preview region.

In some other optional embodiments provided based on the embodiment of FIG. 22 or any one of the optional embodiments, an arrangement sequence of the target image frame included in the stitching preview region is consistent with an arrangement sequence of the selected target subtitle in the subtitle list.

In some other optional embodiments provided based on the embodiment of FIG. 22 or any one of the optional embodiments, the image frame display module 2230 is configured to display the target image frame in the stitching preview region in a folded state, the folded state referring to a display state in which only a subtitle region in the target image frame is visible.

Optionally, the image frame display module 2230 is further configured to:

obtain a display state switching instruction corresponding to the target image frame;

switch, when a display state of the target image frame is an unfolded state, the target image frame from the unfolded state to the folded state for display; and switch, when the display state of the target image frame is the folded state, the target image frame from the folded state to the unfolded state for display, the unfolded state referring to a display state in which all content of the target image frame is visible.

In some other optional embodiments provided based on the embodiment of FIG. 22 or any one of the optional embodiments, the image frame display module 2230 is further configured to cancel, in response to obtaining a deselection instruction corresponding to the target subtitle, displaying of the target image frame in the stitching preview region.

In some other optional embodiments provided based on the embodiment of FIG. 22 or any one of the optional embodiments, the image frame display module 2230 is further configured to:

perform, in response to obtaining a complete preview instruction, equal-proportion reduction processing on the target image frame included in the stitching preview region according to a total length of the target image frame included in the stitching preview region and a length of the stitching preview region, to obtain a processed target image frame, where a total length of the processed target image frame is less than or equal to the length of the stitching preview region; and display the processed target image frame in the stitching preview region.

In some other optional embodiments provided based on the embodiment of FIG. 22 or any one of the optional embodiments, the collage picture includes: the target image frame included in the stitching preview region, and related information of the target video, the related information of the target video including at least one of the following: a name of the target video, a screenshot timestamp corresponding to the target video, source information of the collage picture, or a two-dimensional code corresponding to the collage picture.

Figure 23:
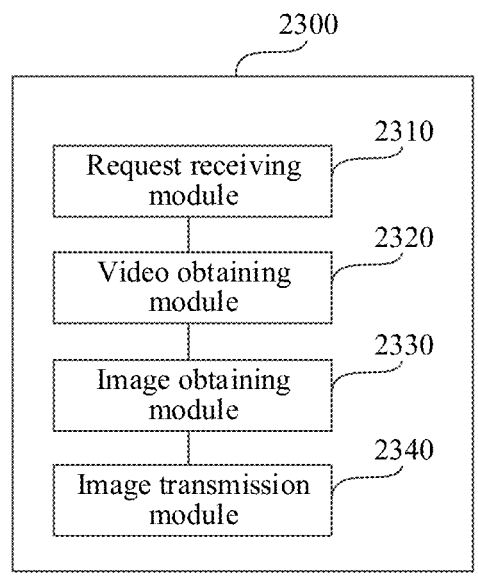
FIG. 23 is a block diagram of a picture generation apparatus according to some embodiments of the present disclosure.

FIG. 23 shows a block diagram of a picture generation apparatus according to some other embodiments of the present disclosure. The apparatus has a function of performing the foregoing method examples of the server side, and the function may be implemented by hardware or may be implemented by hardware executing corresponding software. The apparatus may be the server 20 in FIG. 1, or may be disposed on the server 20. The apparatus 2300 may include: a request receiving module 2310, a video obtaining module 2320, an image obtaining module 2330, and an image transmission module 2340.

The request receiving module 2310 is configured to receive an image obtaining request transmitted by a terminal, the image obtaining request including identification information of a target video and identification information of a target subtitle in the target video.

The video obtaining module 2320 is configured to obtain the target video according to the identification information of the target video.

The image obtaining module 2330 is configured to obtain a target image frame corresponding to the target subtitle from the target video according to the identification information of the target subtitle, the target image frame being an image frame within a display period corresponding to the target subtitle.

The image transmission module 2340 is configured to transmit the target image frame to the terminal, so that the terminal generates a collage picture including the target image frame.

In some optional embodiments provided based on the embodiment of FIG. 23, the apparatus 2300 further includes: a picture receiving module and a picture saving module (not shown in the figure).

The picture receiving module is configured to receive the collage picture transmitted by the terminal.

The picture saving module is configured to save the collage picture.

When the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to one conception. For the specific implementation process, reference may be made to the method embodiments, and details are not described herein again.

In an embodiment, a terminal is further provided. An internal structure of the terminal may be shown in FIG. 24. The terminal includes a picture generation apparatus. The picture generation apparatus includes various modules, and all or some of the modules may be implemented by software, hardware, or a combination thereof.

Figure 24:
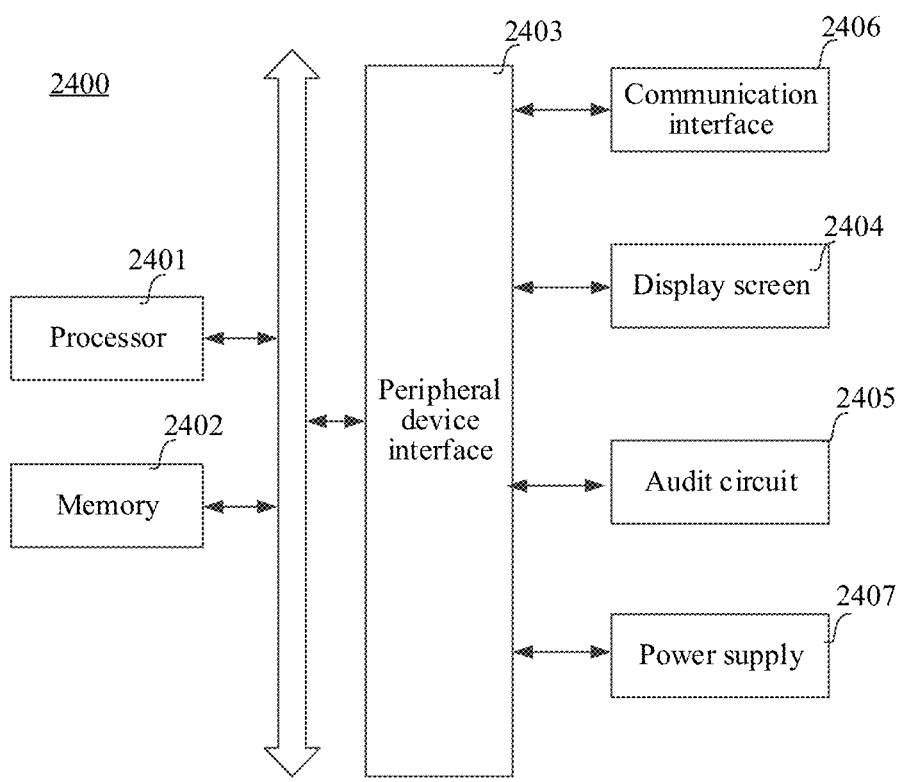
FIG. 24 is a structural block diagram of a terminal according to some embodiments of the present disclosure.

FIG. 24 shows a structural block diagram of a terminal 2400 according to some embodiments of the present disclosure. The terminal 2400 may be a mobile phone, a tablet computer, a smart television, a multimedia playback device, or a PC. The terminal 2400 may be the terminal 10 described in the embodiment of FIG. 1.

Generally, the terminal 2400 includes a processor 2401 and a memory 2402.

The processor 2401 may include one or more processing cores, for example, may be a 4-core processor or an 8-core processor. The processor 2401 may be implemented by using at least one hardware form of digital signal processing (DSP), a field-programmable gate array (FPGA), and a programmable logic array (PLA). The processor 2401 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 2401 may be integrated with a graphics processing unit (GPU). The GPU is configured to be responsible for rendering and drawing content to be displayed by a display screen. In some embodiments, the processor 2401 may further include an artificial intelligence (AI) processor. The AI processor is configured to process a calculation operation related to machine learning.

The memory 2402 may include one or more computer-readable storage media. The computer-readable storage medium may be non-transient. The memory 2402 may further include a high-speed random access memory and a non-volatile memory such as one or more magnetic disk storage devices and a flash storage device. In some embodiments, the non-transient computer-readable storage medium in the memory 2402 is configured to store at least one instruction. The at least one instruction is executed by the processor 2401 to perform the picture generation method of the terminal side provided in the method embodiments of the present disclosure.

In some embodiments, the terminal 2400 further optionally includes a peripheral device interface 2403 and at least one peripheral device. The processor 2401, the memory 2402, and the peripheral device interface 2403 may be connected through a bus or a signal cable. Each peripheral device may be connected to the peripheral device interface 2403 through a bus, a signal cable, or a circuit board. Specifically, the peripheral device may include: at least one of a display screen 2404, an audio circuit 2405, a communication interface 2406, and a power supply 2407.

A person skilled in the art may understand that the structure shown in FIG. 24 does not constitute a limitation on the terminal 2400, and the terminal may include more or fewer components than those shown in the figure, or some components may be combined, or a different component deployment may be used.

In an embodiment, a server is further provided. An internal structure of the server may be shown in FIG. 25. The server includes a picture generation apparatus. The picture generation apparatus includes various modules, and all or some of the modules may be implemented by software, hardware, or a combination thereof.

Figure 25:
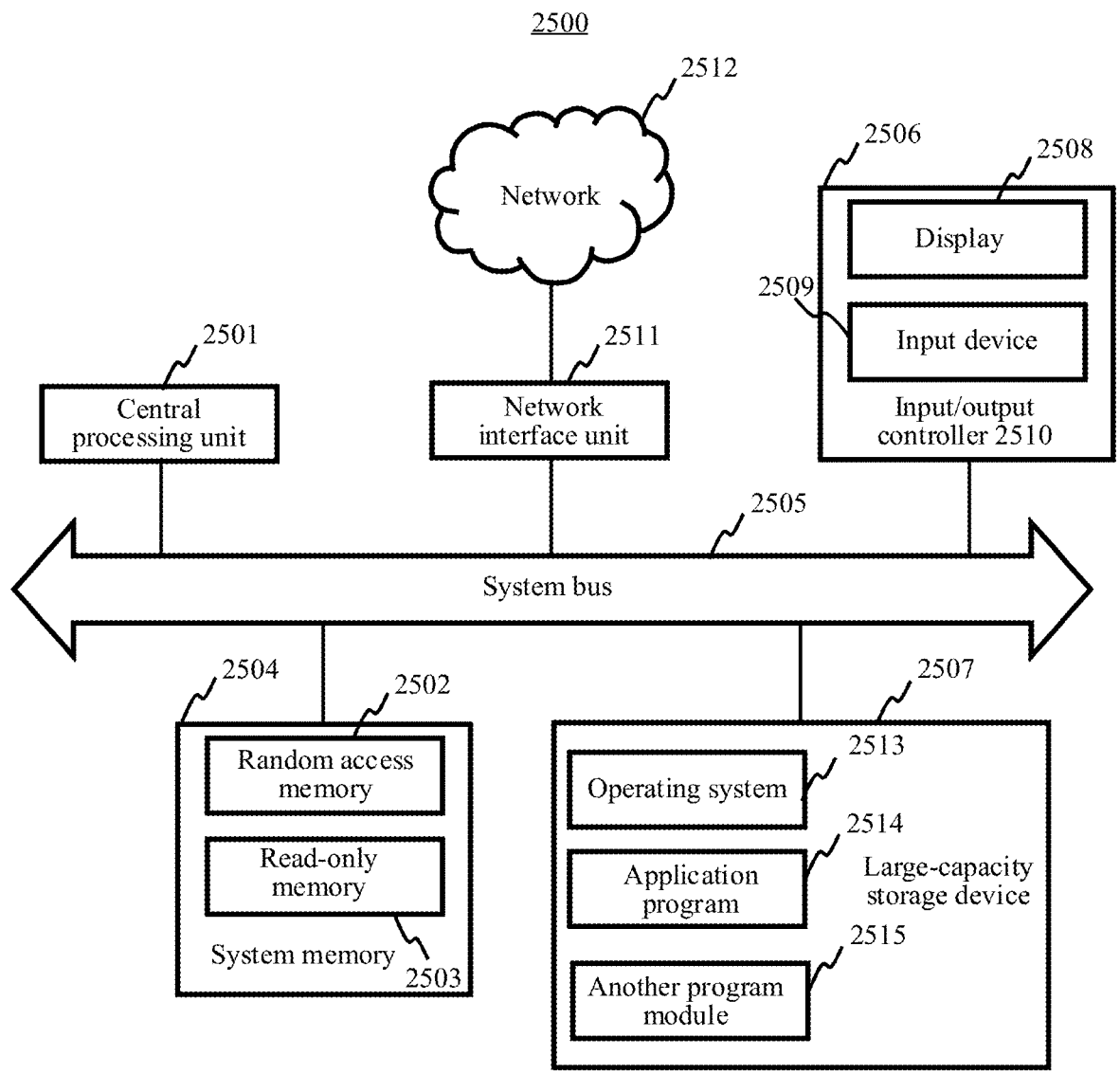
FIG. 25 is a structural block diagram of a server according to some embodiments of the present disclosure.

FIG. 25 shows a schematic structural diagram of a server 2500 according to some embodiments of the present disclosure. The server 2500 may be configured to implement the picture generation method of the server side provided in the foregoing embodiment. The server 2500 may be the server 20 described in the embodiment of FIG. 1. Specifically, the server 2500 includes a central processing unit (CPU) 2501, a system memory 2504 including a random access memory (RAM) 2502 and a read-only memory (ROM) 2503, and a system bus 2505 connecting the system memory 2504 and the CPU 2501. The server 2500 further includes a basic input/output system (I/O system) 2506 for transmitting information between components in a computer, and a large-capacity storage device 2507 configured to store an operating system 2513, an application program 2514, and another program module 2515.

The basic I/O system 2506 includes a display 2508 configured to display information and an input device 2509 such as a mouse or a keyboard that is configured to allow a user to input information. The display 2508 and the input device 2509 are both connected to the CPU 2501 by an input/output (I/O) controller 2510 connected to the system bus 2505. The basic I/O system 2506 may further include the input/output controller 2510 for receiving and processing an input from a plurality of other devices such as a keyboard, a mouse, or an electronic stylus. Similarly, the input/output controller 2510 further provides an output to a display screen, a printer, or another type of output device.

The large-capacity storage device 2507 is connected to the CPU 2501 by using a large-capacity storage controller (not shown) connected to the system bus 2505. The large-capacity storage device 2507 and an associated computer-readable medium provide non-volatile storage for the server 2500. That is, the large-capacity storage device 2507 may include a computer-readable medium (not shown), such as a hard disk or a CD-ROM drive.

Without loss of generality, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 2504 and the large-capacity storage device 2507 may be generally referred to as a memory.

According to various embodiments of the present disclosure, the server 2500 may further be connected, by using a network such as the Internet, to a remote computer on the network and run. That is, the server 2500 may be connected to a network 2512 by using a network interface unit 2511 connected to the system bus 2505, or may be connected to another type of network or remote computer system (not shown) by using the network interface unit 2511.

The memory further includes one or more programs. The one or more programs are stored in the memory and configured to be executed by one or more processors. The one or more programs include instructions used for performing the picture generation method of the server side.

In an exemplary embodiment, a terminal is further provided, including a processor and a memory, the memory storing at least one instruction, at least one program, a code set or an instruction set. The at least one instruction, the at least one program, the code set or the instruction set is configured to be executed by one or more processors to implement the picture generation method of the terminal side.

In an exemplary embodiment, a server is further provided, including a processor and a memory, the memory storing at least one instruction, at least one program, a code set or an instruction set. The at least one instruction, the at least one program, the code set or the instruction set is configured to be executed by one or more processors to implement the picture generation method of the server side.

In an exemplary embodiment, a computer-readable storage medium is further provided, the storage medium storing at least one instruction, at least one program, a code set or an instruction set, and the at least one instruction, the at least one program, the code set or the instruction set being executed by a processor of a computer device to implement the picture generation method of the terminal side, or the picture generation method of the server side.

Optionally, the computer readable storage medium may be a ROM, a RAM, a CD-ROM, a magnetic tape, a floppy disk, an optical data storage device, or the like.

In an exemplary embodiment, a computer program product is further provided, when executed, the computer program product being configured to implement the picture generation method of the terminal side, or the picture generation method of the server side.

It is to be understood that "a plurality of" described in this specification refers to two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

A person of ordinary skill in the art may understand that all or some of steps of the embodiments may be implemented by hardware or a program instructing related hardware. The program may be stored in a computer-readable storage medium. The storage medium mentioned above may be a ROM, a magnetic disk or an optical disc.

The foregoing descriptions are merely exemplary embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A picture generation method, performed by a terminal, the method comprising:
    displaying a subtitle list of a target video, the subtitle list comprising at least one subtitle;
    obtaining, in response to a selection instruction corresponding to a target subtitle in the subtitle list, a target image frame corresponding to the target subtitle in the target video, the target image frame being an image frame shown within a display period corresponding to the target subtitle;
    displaying the target image frame in a stitching preview region; and
    generating, in response to a picture generation instruction, a collage picture according to the target image frame comprised in the stitching preview region, wherein the collage picture comprises the target image frame in the stitching preview region and related information of the target video, the related information of the target video comprising one or more of: a name of the target video, a screenshot timestamp corresponding to the target video, source information of the collage picture, or a two-dimensional code corresponding to the collage picture.

2. The method according to claim 1, wherein the displaying a subtitle list of a target video comprises:
    displaying a playing interface of the target video;
    obtaining a trigger instruction corresponding to a target operation control in the playing interface;
    obtaining a real-time image frame of the target video according to the trigger instruction, the real-time image frame being an image frame displayed in the playing interface when the trigger instruction is obtained;
    displaying a subtitle stitching interface, the subtitle stitching interface comprising a subtitle display region and the stitching preview region; and
    displaying the subtitle list of the target video in the subtitle display region, and displaying the real-time image frame in the stitching preview region.

3. The method according to claim 1, wherein an arrangement sequence of the target image frame comprised in the stitching preview region is consistent with an arrangement sequence of the target subtitle in the subtitle list.

4. The method according to claim 1, wherein the displaying the target image frame in a stitching preview region comprises:
    displaying the target image frame in a folded state in the stitching preview region, the folded state referring to a display state in which only a subtitle region in the target image frame is visible.

5. The method according to claim 4, further comprising:
    obtaining a display state switching instruction corresponding to the target image frame;
    switching, when a display state of the target image frame is an unfolded state, the target image frame from the unfolded state to the folded state for display; and
    switching, when the display state of the target image frame is the folded state, the target image frame from the folded state to the unfolded state for display, the unfolded state referring to a display state in which all content of the target image frame is visible.

6. The method according to claim 1, wherein after the displaying the target image frame in a stitching preview region, the method further comprises:
    canceling, in response to a deselection instruction corresponding to the target subtitle, displaying of the target image frame in the stitching preview region.

7. The method according to claim 1, wherein the stitching preview region includes a plurality of target image frames and the method further comprises:
    scaling down, in response to a complete preview instruction, the target image frames comprised in the stitching preview region according to a total length of the target image frames comprised in the stitching preview region and a length of the stitching preview region, to obtain scaled-down target image frames, wherein a total length of the scaled-down target image frames is less than or equal to the length of the stitching preview region; and
    displaying the scaled-down target image frames in the stitching preview region.

8. The method according to claim 1, further comprising:
    after receipt of the picture generation instruction but prior to generating the collage picture, determining whether a user account is in a logged-in state;
    in response to determining the user account is in the logged-in state, generating the collage picture; and
    in response to determining the user account is not in the logged-in state, displaying a login subtitle box to receive login operation by the user account.

9. A terminal, comprising a memory and a processor, the memory storing a computer-readable instruction, and when executing the computer-readable instruction, the processor is configured to perform:
    displaying a subtitle list of a target video, the subtitle list comprising at least one subtitle;
    obtaining, in response to a selection instruction corresponding to a target subtitle in the subtitle list, a target image frame corresponding to the target subtitle in the target video, the target image frame being an image frame within a display period corresponding to the target subtitle;
    displaying the target image frame in a stitching preview region; and
    generating, in response to a picture generation instruction, a collage picture according to the target image frame comprised in the stitching preview region, wherein the collage picture comprises the target image frame in the stitching preview region and related information of the target video, the related information of the target video comprising one or more of: a name of the target video, a screenshot timestamp corresponding to the target video, source information of the collage picture, or a two-dimensional code corresponding to the collage picture.

10. The terminal according to claim 9, wherein the displaying a subtitle list of a target video comprises:
    displaying a playing interface of the target video;
    obtaining a trigger instruction corresponding to a target operation control in the playing interface; obtaining a real-time image frame of the target video according to the trigger instruction, the real-time image frame being an image frame displayed in the playing interface when the trigger instruction is obtained;

displaying a subtitle stitching interface, the subtitle stitching interface comprising a subtitle display region and the stitching preview region; and displaying the subtitle list of the target video in the subtitle display region, and displaying the real-time image frame in the stitching preview region.

11. The terminal according to claim 9, wherein an arrangement sequence of the target image frame comprised in the stitching preview region is consistent with an arrangement sequence of the target subtitle in the subtitle list.

12. The terminal according to claim 9, wherein the displaying the target image frame in a stitching preview region comprises:

displaying the target image frame in a folded state in the stitching preview region, the folded state referring to a display state in which only a subtitle region in the target image frame is visible.

13. The terminal according to claim 12, wherein the computer-readable instruction further causes the processor to perform:

obtaining a display state switching instruction corresponding to the target image frame;

switching, when a display state of the target image frame is an unfolded state, the target image frame from the unfolded state to the folded state for display; and switching, when the display state of the target image frame is the folded state, the target image frame from the folded state to the unfolded state for display, the unfolded state referring to a display state in which all content of the target image frame is visible.

14. The terminal according to claim 9, wherein after the displaying the target image frame in a stitching preview region, the computer-readable instruction further causes the processor to perform:

canceling, in response to a deselection instruction corresponding to the target subtitle, displaying of the target image frame in the stitching preview region.

15. The terminal according to claim 9, wherein the stitching preview region includes a plurality of target image frames and the computer-readable instruction further causes the processor to perform:

scaling down, in response to a complete preview instruction, the target image frames comprised in the stitching preview region according to a total length of the target image frames comprised in the stitching preview region and a length of the stitching preview region, to obtain a scaled-down target image frames, wherein a total length of the scaled-down target image frame is less than or equal to the length of the stitching preview region; and displaying the scaled-down target image frames in the stitching preview region.

16. The terminal according to claim 9, wherein the processor is configured to further perform:

after receipt of the picture generation instruction but prior to generating the collage picture, determining whether a user account is in a logged-in state;

in response to determining the user account is in the logged-in state, generating the collage picture; and in response to determining the user account is not in the logged-in state, displaying a login subtitle box to receive login operation by the user account.

17. One or more non-transitory storage media storing a computer-readable instruction, the computer-readable instruction, when executed by one or more processors, causing the one or more processors to perform:

displaying a subtitle list of a target video, the subtitle list comprising at least one subtitle;

obtaining, in response to a selection instruction corresponding to a target subtitle in the subtitle list, a target image frame corresponding to the target subtitle in the target video, the target image frame being an image frame shown within a display period corresponding to the target subtitle;

displaying the target image frame in a stitching preview region; and generating, in response to a picture generation instruction, a collage picture according to the target image frame comprised in the stitching preview region, wherein the collage picture comprises the target image frame in the stitching preview region and related information of the target video, the related information of the target video comprising one or more of: a name of the target video, a screenshot timestamp corresponding to the target video, source information of the collage picture, or a two-dimensional code corresponding to the collage picture.

18. The storage media according to claim 17, wherein the displaying a subtitle list of a target video comprises:

displaying a playing interface of the target video; obtaining a trigger instruction corresponding to a target operation control in the playing interface;

obtaining a real-time image frame of the target video according to the trigger instruction, the real-time image frame being an image frame displayed in the playing interface when the trigger instruction is obtained;

displaying a subtitle stitching interface, the subtitle stitching interface comprising a subtitle display region and the stitching preview region; and displaying the subtitle list of the target video in the subtitle display region, and displaying the real-time image frame in the stitching preview region.

19. The storage media according to claim 17, wherein an arrangement sequence of the target image frame comprised in the stitching preview region is consistent with an arrangement sequence of the target subtitle in the subtitle list.

20. The storage media according to claim 17, wherein the displaying the target image frame in a stitching preview region comprises:

displaying the target image frame in a folded state in the stitching preview region, the folded state referring to a display state in which only a subtitle region in the target image frame is visible.

* * * * *